United States Patent [19]

Rossiter et al.

[11] Patent Number: 5,262,052
[45] Date of Patent: Nov. 16, 1993

[54] POLYSILOXANES CONTAINING PENDANT CYANO SUBSTITUTED BIPHENYLS AS STATIONARY PHASES FOR CHROMATOGRAPHIC COLUMNS

[75] Inventors: Bryant E. Rossiter; Jerald S. Bradshaw, both of Provo; Shawn L. Reese, Pleasant Grove; Abdul Malik, Provo; Milton L. Lee, Pleasant Grove, all of Utah

[73] Assignee: Brigham Young University, Provo, Utah

[21] Appl. No.: 848,300

[22] Filed: Mar. 9, 1992

[51] Int. Cl.$^5$ .......................... B01D 15/08
[52] U.S. Cl. .................. 210/635; 210/656; 210/198.2; 95/82; 95/88; 96/101
[58] Field of Search .......... 210/635, 656, 198.2; 55/67, 197, 386

[56] References Cited

U.S. PATENT DOCUMENTS 4,864,033 9/1989 Bradshaw .................. 548/446

OTHER PUBLICATIONS

Richter, Chromatographia, vol. 17, No. 10, pp. 570–573, Oct. 1983.
Bayona, Int J. Environ. Anal Chem., vol. 28, 1987, pp. 263–278.
Benton, J. Am. Chem. Soc., vol. 64, May 1942, pp. 1128–1129.
Blum, J. High Resolut. Chromatogr./Chromatogr. Commun. II, 1988, pp. 148–156.
Poole, Chem. Rev. 1989, 89, pp. 377–395.
Davies, Multidimensional Chromatography, M. J. Cortes Ed. (Marcel Dekker, New York, 1990) pp 301–330.
Gemmell, Mol. Cryst. Liq. Cryst., 122, (1985) pp. 205–218.
Golovnya, J. High Resolut. Chromatogr./Chromatogr. Commun. vol. 3, Feb. 1980 pp. 51–61.
Golovnya, Chromatographia, vol. 10, No. 11, Nov. 1977, pp. 658–660.
Golovnya, J. High Resolut. Chromatogra./Chromatogr. Commun. 3, 1980 pp. 4–10.
Jones, Chromatography Forum, May–Jun. 1986, pp. 38–44.
Grob, J. Chromatogr. vol. 347 (1985) pp. 351–356.
Kostromin, Vysokomole Kulyarnye Soedineniya, vol. 35, 1991, pp. 1115–1119.
Li, Anal. Chem. vol. 64, No. 2, Jan. 1992, pp. 210–218.
Lee, Open Tubular Column Gas Chromatography: Theory and Practice (Wiley: New York, 1984), p. 74.
Markides, J. High Resolut. Chromatogr./Chromatogr. Commun., vol. 8 1985 pp. 741–747.
Me Omie, Chem. Ind. 1658 (1963).
McReynolds, J. Chromatogra. Sci. vol. 8, Dec. 1970 pp. 685–691.
Negishi, J. Org. Chem., 42, 1821–1823 (1977).
Poole, Lc-GC 6,(1988) pp. 400–412.
Rohrschneider, J Chromatogr. vol. 22, 1966, pp. 6–22.
Rohrschneider, Adv. Chromatogr.m vol. 4 1967 pp. 333–363.
Rouse, Anal. Chem. vol. 60, 1988, pp. 901–905.
Sidisky, J. High Resolut. Chromatogra/Chromatogra. Commun., vol. 14 1991 pp. 191–195.
Sumpter, J. Chromatogr. vol. 517, 1990, pp. 503–519.
Blum, J. High Resolut. Chromatogra./Chromatogra. Commun. vol. 8 (1985) pp. 718–726.
Blum, J Microcol. Sep vol. 3, No. 4, Jul. 1991 pp. 325–330.
Blum, J. High Resolut. Chromatogr./Chromatogr. Commun. vol. 9, 1986, pp. 350–355.
Juvancz, J. Microcol. Sep. vol 1 No. 3 (1989) pp. 142–149.

*Primary Examiner*—Ernest G. Therkorn
*Attorney, Agent, or Firm*—Thorpe, North & Western

[57] ABSTRACT

A chromatographic column, which has for a stationary phase a polysiloxane containing pendant cyano-substituted biphenyls, is selective in the chromatographic separation of organic compounds including polycyclic aromatic hydrocarbon isomers.

25 Claims, 18 Drawing Sheets

POLYSILOXANES CONTAINING PENDANT CYANO SUBSTITUTED BIPHENYLS AS STATIONARY PHASES FOR CHROMATOGRAPHIC COLUMNS

FIELD OF THE INVENTION

The present invention relates to methods employing polysiloxanes containing pendant substituted biphenyls as the stationary phases of gas, liquid, and supercritical fluid chromatographic columns for the analyses and separation of mixtures of polar and polarizable organic compounds.

THE PRIOR ART

Polysiloxanes are known for their utility as coatings for stationary phases in chromatography. Typically, in such polymers, side chains of various chemical composition are attached to a polymer backbone, Jones et al. *Chromatography Forum*, May-June 38 (1986); M. L. Lee, et al., *Open Tubular Column Gas Chromatography: Theory and Practice* (Wiley: New York 1984) p. 74. In capillary chromatography, achieving maximum separation of components, which is extremely important for successful identification of those components, and achieving maximum resolution of the chromatographic peaks depends on at least two important factors: (1) selectivity and (2) efficiency. Simply stated, selectivity has reference to the distance between the peaks in the resultant chromatogram, whereas efficiency relates to minimizing the width of the peaks. Thus, both selectivity and efficiency affect the resolution and separation of the peaks in the chromatogram.

In a typical chromatography apparatus, it is desirable to have a stationary phase which is operable over a temperature range from about ambient temperature to about 3001°-350° C. Such a temperature range allows gas-liquid chromatography programming to start at ambient temperature and go to higher temperatures as needed to separate the particular chemical components involved. Since the materials from which the gas-liquid chromatographic column and oven are manufactured dictate the limits of this temperature range, it is extremely important that the stationary phase used inside the column also have a versatile temperature range of operation.

High thermal stability and polarity are properties that are usually difficult to achieve simultaneously in the same stationary phase. This is evident from the fact that the upper temperature limit for a nonpolar polysiloxane phase can approach 400° C., while those for standard, polar phases, such as Carbowax 20M (medium polar) and 100% cyanopropylpolysiloxane (highly polar), are less than 300° C., respectively; M. L. Lee, et al., *Open Tubular Column Gas Chromatography: Theory and Practice* (Wiley: New York, 1984), p. 74.

Attempts have been made to produce polar columns with higher thermostability either through improvement of the cross-linking process for the existing polar phases, B. E. Richter, et al. *Chromatographia* 17, 570 (1983), or through synthesis of new polar phases, Z. Juvancz, et al., *J. Microcol. Sep.* 1, 142 (1989). A significant improvement in thermal stability was achieved through introduction of OH-terminated phases that can be chemically bonded to the capillary surface; K. Grob, et al., *J. Chromatogr.* 347, 356 (1985); W. Blum, *J. High Resolut. Chromatogr./Chromatogr. Commun.* 8, 718 (1985); W. Blum, et al., *J. Microcol. Sep.* 3, 325 (1991). Nonpolar columns of this type which exhibit upper temperature limits of up to 390° C. (occasionally even up to 420° C.) were reported by Blum et al., *J. High Resolut. Chromatogr./Chromatogr. Commun.* 11, 148 (1988). The same group reported a relatively polar column with an OH-terminated 33% cyanopropyl polysiloxane phase that had an upper temperature limit of 320° C.; W. Blum, *J. High Resolut. Chromatogr./Chromatogr. Commun.* 9, 350 (1986). Although a medium polar column with OH-termination (OV-225-OH) was claimed to have an upper temperature limit of 380°-390° C., the column lost its inertness after a few days use, K. Grob, et al., W. Blum, W. Blum, et al. supra. Preparation of columns with OH-terminated phases requires extensive leaching of the capillary surface which limits their fabrication only to glass capillaries. There has been no preparation of fused silica capillary columns with OH-terminated phases. In spite of the high thermostability of the columns with OH-terminated phases, their separation efficiency and selectivity are often insufficient, especially for the separation of complex mixtures containing isomers; W. Blum et al., *J. High Resolut. Chromatogr./Chromatogr. Commun.* 11, 148 (1988).

Richter et al. *Chromatographia*, 17, 570 (1983) have improved cyanopropyl polysiloxane stationary phases, by making them cross-linkable such that they can be operated up to 280° C. However, this phase was limited to 50% substitution, meaning that each silicon contains one cyanopropyl group. Other improvements in this area have led to the development of OH-terminated cyanopropyl phases which are chemically bonded directly to the column surface W. Blum, *J. High Resolution Chromatogr./Chromatogr. Commun.* 9, 350 (1986) and W. Blum et al. *J. High Resolution Chromatogr./Chromatogr. Commun.* 11, 148 (1988).

U.S. Pat. No. 4,864,033 describes liquid crystalline polymers formed by esterifying an alkenyloxbiphenylcarboxylic acid with a phenol to form the corresponding ester. This ester is then reacted with an alkyl polysiloxane polymer to form a polysiloxane polymer with pendant phenolate substituted biphenyls.

The polysiloxanes described by the above mentioned patent are useful in chromatographic separations of various chemical compounds such as polycyclic aromatic hydrocarbons. However, the polysiloxanes polymers described in the patent exhibit poor resolution of the isomeric azaarenes because many of the isomeric axaarenes have the same shape and differ only in the position of the nitrogen heteroatom.

Gemmell et al., *Mol. Cryst. Liq. Cryst.*, 22, 205-218 (1985), describe the synthesis of liquid crystalline polysiloxanes with pendant cyano-substituted biphenyl side chains. There is no description or suggestion that the polymers described therein may be used in chromatographic separations.

OBJECTS AND BRIEF SUMMARY OF THE INVENTION

It is an objective of the present invention to provide new polysiloxane stationary phases with pendant cyano-substituted biphenyl substituents which are useable as stable polar phases. The novel polysiloxane stationary phases of this invention have improved shape selectivity as compared with the phenolate biphenyl esters and are more polar than the polarizable phases such as unsubstituted biphenyl.

Another object of the present invention is to provide superior methods for separating mixtures of organic compounds using gas-liquid chromatography.

A further object of the present invention is to provide stationary phases which are capable of performing separations based on the polarity properties of the solutes in addition to vapor pressure and other solute properties.

Yet another object of the present invention is to provide superior methods for separating various chemical compounds from mixtures thereof using supercritical fluid chromatography (SFC).

It is another object of the present invention is to provide liquid chromatography columns containing the cyano-substituted biphenyl stationary phases.

An additional object of the present invention is to provide chromatography columns that are coated or bonded with polysiloxane cyano-substituted biphenyl polymers.

A yet further object of the present invention is to provide a method for the separation of mixtures of polar or polarizable organic compounds which utilize chromatography columns coated with polysiloxane cyano-substituted biphenyl polymers.

Another further object of the present invention is to provide chromatographic columns and methods for achieving chromatographic separations of structural and stereoisomers of various organic compounds from a mixture.

A further additional object of the present invention is to provide a chromatographic column wherein the interior surface is coated with polysiloxane cyano-substituted biphenyl polymers.

Yet another further object of the present invention is to provide a chromatographic column which is packed with particles coated with polysiloxane cyano-substituted biphenyl polymers.

These and other objects may be accomplished through the use of polysiloxane cyano-substituted biphenyl polymers which demonstrate high selectivity for the separation and analysis of the isomers of polar or polarizable organic compounds while possessing thermal stability at the temperatures required in the chromatographic columns.

Polysiloxane gums have proven to be the most popular materials for stationary phases in both gas chromatography (GC) and supercritical fluid chromatography (SFC). These materials exhibit high thermal stabilities with regard to film rearrangement and chemical breakdown. The polysiloxanes have also demonstrated exceptionally high permeability to solutes giving high efficiencies in the separation of a variety of chemical mixtures. To date a large number of stationary phases have been synthesized and evaluated for use in gas chromatography (GC) and supercritical fluid chromatography (SFC).

The chromatographic columns must have the following characteristics:

1. The stationary phase must be easy to coat as a thin film on the inner surface of capillaries having dimensions typically used in gas chromatography (GC) and supercritical fluid chromatography (SFC). This in turn requires that the stationary phase must have a good solubility in a low-boiling solvent (such as dichloromethane) and have high viscosity.

2. The stationary phase must possess a molecular structure that will allow efficient diffusion of the solutes.

3. The coated thin film of the stationary phase should possess the ability to be easily cross-linked without deterioration of its diffusion and mass-transfer characteristics, and ultimately the efficiency of the resulting column.

4. The stationary phase should be thermally stable to withstand elevated temperatures.

These criteria are met by polymers of the following general formula 1

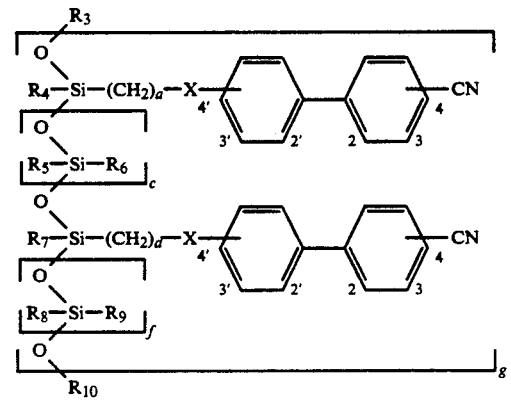

wherein a and d are integers from about 0 to 22, preferably from 1 to 6; c and f are integers from about 0 to 10, preferably from 1 to 5; g is an integer from about 1 to 200, preferably 1 to 20; $R_3$ and $R_{10}$ are selected from the group consisting of hydrogen, lower alkyl, lower aryl, lower arylalkyl, lower silyl alkyl, and substitutions thereof; and $R_4$, $R_5$, $R_6$, $R_7$, $R_8$, and $R_9$ selected from the group consisting of hydrogen, lower amyl, lower aryl, lower arylalkyl and X is a linking group that does not interfere with the use of the polymer as a stationary phase for chromatographic columns, preferably O, S or $CH_2$. The term lower alkyl encompasses from 1 to 10 carbon atoms. The linking group can be on the 2', 3' or 4' positions of the biphenyl ring and the cyano substituent can be on the 2, 3 or 4 positions of the biphenyl ring.

The polysiloxane cyano-substituted biphenyl polymers of this invention show a high selectivity for the separation and analysis of the isomers of polar or polarizable organic compounds such as azaarenes. They also show thermal stability at the temperatures required in the chromatographic columns. In supercritical fluid chromatography a cyano-biphenyl column provided better separation for a coal tar sample than columns with biphenyl or cyanopropyl phases. The retention behavior of fatty acid methyl esters and a mixture of polar solutes was investigated on the cyano-biphenyl and the reference phases. With respect to certain solute pairs, selectivities of the new stationary phases were found to increase with temperature. The new cyano-biphenyl phases were found to be useful for the gas chromatography (GC) and supercritical fluid chromatography (SFC) separation of various classes of complex mixtures including essential oils, explosives residues, polar and polarizable organic compounds and polycyclic aromatic hydrocarbons.

The substitution of a cyano group on the second phenyl ring increases the polarity and polarizability of the biphenyl moiety and thereby unexpectedly enhances the selectivity of the column. Chromatographic tests were performed on an isomeric series of cyanobiphenyl-substituted polysiloxanes. The results of these tests indicated that the polysiloxane cyano-substituted biphenyl polymers unexpectedly improved the separation and detection of isomers of polycyclic aromatic hydrocarbons, as compared with the unsubstituted biphenyl polysiloxane polymers. Additional results demonstrated the polysiloxane cyano-substituted biphenyl polymers showed unexpected differences in the separation of the isomers of polar or polarizable organic compounds that have the same shape only differing in the position of the polarizable heteroatom such as azaarenes, as compared with the polysiloxane polymers illustrated in U.S. Pat. No. 4,864,033 to Bradshaw et al. The results of these experiments also indicated that polysiloxane cyano-substituted biphenyl polymers were stable at high column temperatures. For most of the new phases, the upper temperature limit was approximately 300° C.

Some of the cyano-substituted biphenyl polysiloxane polymer (CBP) stationary phases showed polarities higher than that for carbowax 20M or 50% cyanopropyl phases. All six positional isomers of dodecylxylene and five isomers of four-ring polycyclic aromatic hydrocarbons were baseline resolved on gas chromatography (GC) capillary columns with cyanobiphenyl phases demonstrating higher selectivity over SE-54 or Carbowax 20M phases.

DETAILED DESCRIPTION OF THE INVENTION

Figure 1A:
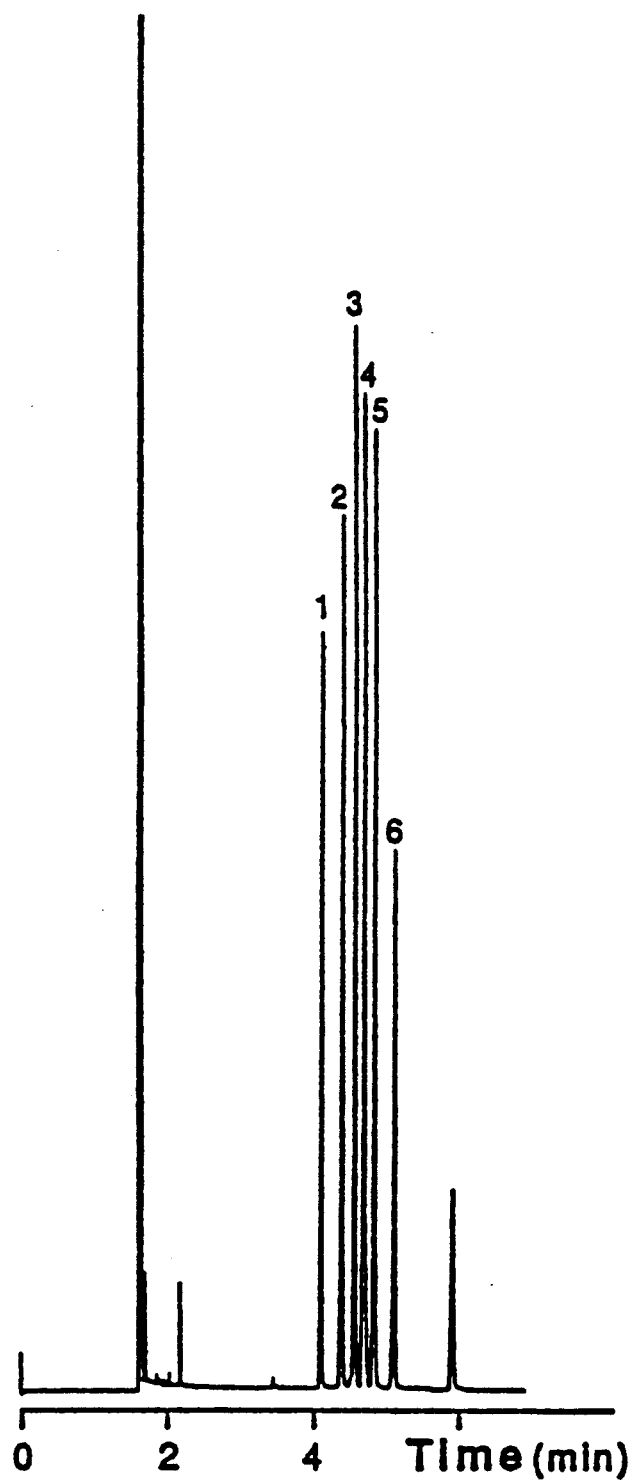
FIGS. 1A, 1B, and 1C are gas chromatograms of the separation of dodecylxylene isomers on cyanobiphenyl, Carbowax 20M, and SE-54 columns respectively.

The polysiloxanes containing pendant cyano substituted biphenyls are formed by the following general steps:
1) The biphenyl rings containing one cyano group on the first ring and one ether or thioether containing linking group on the second ring, are prepared by first forming a Grignard reagent from magnesium metal and an haloaryl alkyl ether or haloaryl alkyl thioether such as 4-bromoanisole, treating the Grignard with an anhydrous zinc halide such as zinc chloride and reacting the resulting reagent with a halobenzonitrile such as 4-bromobenzonitrile in the presence of a transition metal catalyst such as tetrakistriphenylphosphine nickel (O).
2) The resulting cyanobiphenyl alkyl ether or cyanobiphenyl alkyl thioether is treated with a reagent such as boron tribromide to remove the alkyl group from the ether or thioether to give a phenol or thiophenol.
3) The cyano-substituted biphenol or thiobiphenol is treated with an alkene containing alkyl halide such as allyl bromide to form the corresponding cyano-substituted biphenyl alkenyl ether or thioether.
4) The alkene in the cyano substituted biphenyl alkyl ether or thioether is hydrosilylated with a polysiloxane containing silicon hydrogen bonds to form the polysiloxane cyano substituted biphenyl alkyl ether or thioether polymer.

1a) The biphenyl rings containing one cyano group on the first ring and an alkene containing alkyl (instead of alkyl ether or thioether as in steps 1–4) group on the second ring, are prepared by first forming a Grignard reagent from magnesium metal and an haloarylalkene such as 4-bromo-1-allylbenzene, treating the Grignard with an anhydrous zinc halide such as zinc chloride and reacting the resulting reagent with a halobenzonitrile such as 4-bromobenzonitrile in the presence of a transition metal catalyst such as tetrakistriphenylphosphine nickel (O).

2a) The resulting cyanobiphenylalkene is hydrosilylated with a polysiloxane containing silicon hydrogen bonds to form the polysiloxane cyano substituted biphenyl alkyl polymer.

A more detailed description for the formation of the ether linked polysiloxane follows.

The cyanobiphenyls were synthesized using a simple four-step procedure.

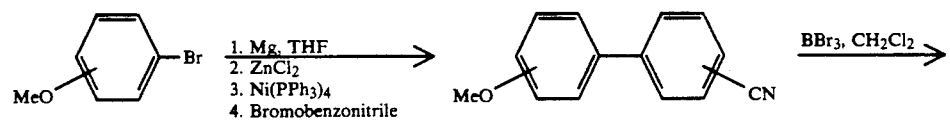

1

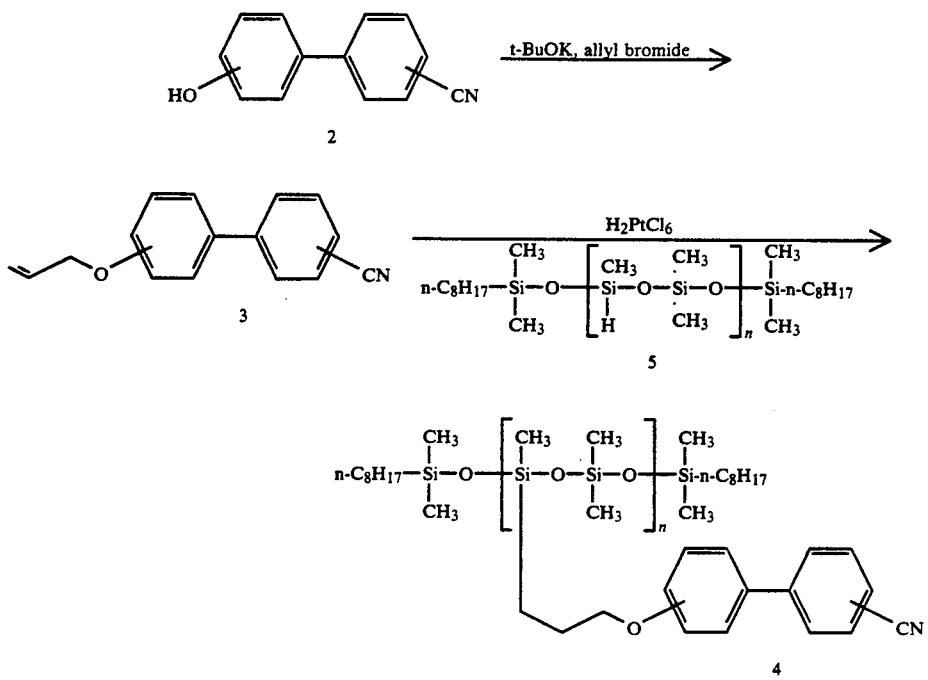

The first step consists of forming the methoxyphenyl zinc halide from the corresponding Grignard and ZnCl₂, combining this with bromocyanobenzonitrile and a nickel(O) catalyst derived from nickel acetylacetonate and diisobutylaluminum hydride (DIBAL) developed from a procedure by Negishi et al., *J. Org. Chem.*, 42, 1821 (1977). The methoxy cyanobiphenyls are synthesized cleanly in reasonably good yields. These materials are then treated with BBr₃ in CH₂Cl₂ to give the corresponding phenols, Benton et al., *J. Am. Chem. Soc.*, 64, 1128 and McOmie et al., *Chem. Ind.*, 1658 (1963). Each phenol is then treated with potassium t-butoxide in THF followed by allyl bromide to give the corresponding biphenyl allyl ether. Hydrosilylation of these materials with poly[oxytrimethyldisiloxanediyl] (MW=ca. 8000), 5, gave the polymeric products as slightly colored gums.

4a: 2'-O, 2-CN
4b: 3'-O, 2-CN
4c: 4'-O, 2-CN
4d: 2'-O, 3-CN
4e: 3'-O, 3-CN
4f: 4'-O, 3-CN
4g: 2'-O, 4-CN
4h: 3'-O, 4-CN
4i: 4'-O, 4-CN.

Compounds 1a-i were synthesized according to the following general procedure on approximately the same scale. Yields, physical data, and spectral characterizations of 1a-i are given below.

EXAMPLE 1

4-(4-Methoxyphenyl)benzonitrile, 1i

A three-neck 500-mL round bottom flask was flushed with N₂ and charged with 250 mL of anh THF and Mg turnings (5.0 g, 206 mmol). 1,2-Dibromoethane (2 mL, 2 mmol) was added to activate the Mg. The reaction mixture was charged with 4-bromoanisole (19.35 g, 104 mmol) and refluxed for 2 h giving a grey-yellow solution. The reaction mixture was charged with ZnCl₂, (14.0 g, 100 mmol) and stirred for 30 minutes.

In a separate 1-L Schlenk flask, which had been purged with N₂, the following reagents were added sequentially with stirring over 1 hour at 25° C. to make the Ni catalyst: 250 mL anh THF, Ni(acac)₂, (1.3 g, 5 mmol), PPh₃ ( 5.25 g, 20 mmol), p-bromobenzonitrile (14 g, 75 mmol) and DIBAL (1M in toluene, 5 mL, 5 mmol). The resulting solution was burgundy red.

The contents of the first flask were added via cannula to the flask containing the Ni catalyst and the combined mixture was refluxed overnight. The reaction mixture was cooled, quenched with ice and concentrated using a rotoevaporator to a brown sludge. This solid was treated sequentially 3 times with 100 mL of 1N HCl and 3 times with 100 mL of diethyl ether. The combined ether layers were washed 3 times with 100 mL of 1N NAOH, 3 times with 100 mL of brine, and 2 times with 100 mL of water. The ether layer was concentrated using a rotoevaporator to yield a tan precipitate. The tan precipitate was extracted 6 times with 200 mL of hot hexane which, upon cooling, gave 8.5 g of white crystals (46%). Mp 72°-75° C.; IR (KBr) 3072, 2966, 2848, 2226, 1601, 1409, 1296, 1237, 1172, 1037, 820, 538 cm⁻¹; ¹H NMR (CDCl₃) δδ 7.6-7.8 (m, 4 H), 6.8-7.4 (m, 4 H), 3.9 (s, 3 H); MS m/e 209 (M+) 194, 166, 140.

2-(2-Methoxyphenyl)benzonitrile, 1a

Yield 50%; mp 54°-55° C.; IR (KBr) 3060, 2942, 2837, 2226, 1601, 1495, 1255, 1025, 756 cm⁻¹; ¹H NMR δδ 7.0-7.8 (m, 8 H), 3.85 (s, 3 H); MS m/e 209 (M+), 194, 179, 166.

2-(3-Methoxyphenyl)benzonitrile, 1b

Yield 29%; mp 57°-60° C.; IR 3065, 2937, 2835, 2222, 1575, 1455, 1270, 1041, 867 cm⁻¹; ¹H NMR δδ 7.35-7.8 (m, 5 H), 7.1-7.2 (m, 2 H), 7.0 (d, 1 H), 3.9 (s, 3 H); MS m/e 209 (M+), 194, 181, 166.

2-(4-Methoxyphenyl)benzonitrile, 1c

Yield 91%; mp 84°-85° C.; IR (KBr) 3036, 2989, 2942, 2837, 2226, 1613, 1519, 1478, 1249, 1104, 1036, 820, 751 cm$^{-1}$; $^1$H NMR δδ 7.4–7.8 (m, 6 H), 6.9–7.1 (m, 2 H), 3.8 (s, 3 H); MS m/e 209 (M+), 194, 179, 166.

3-(2-Methoxyphenyl)benzonitrile, 1d

Yield 30%; mp 58° C.; IR (KBr) 3060, 2942, 2825, 2225, 1601, 1466, 1243, 1020, 896, 749 cm$^{-1}$; $^1$H NMR δδ 7.25–7.9 (m, 6 H), 7.0–7.1 (m, 2 H), 3.8 (s, 3 H); MS m/e 209 (M+), 194, 179, 166.

3-(3-Methoxyphenyl)benzonitrile, 1e

Yield 34%; mp 43°-47° C.; IR 3080, 3001, 2938, 2835, 2228, 2063, 1841, 1698, 1660, 1316, 1233, 1038 cm$^{-1}$; $^1$H NMR δδ 6.9–7.9 (m, 8 H), 3.8–4.0 (s, 3 H); MS m/e 209 (M+), 194, 181, 166.

3-(4-Methoxyphenyl)benzonitrile, 1f

Yield 48%; mp 63°-68° C.; IR 3041, 2984, 2836, 2231, 1608, 1475, 1249, 1024, 836, 803 cm$^{-1}$; $^1$H NMR δδ 7.4–7.8 (m, 6 H), 7.0 (m, 2 H), 3.85 (s, 3 H); MS m/e 209 (M+), 194, 179, 166.

4-(2-Methoxyphenyl)benzonitrile, 1g

Yield 45%; mp 72°-75° C.; IR 3060, 3013, 2942, 2837, 2214, 1607, 1454, 1425, 1237, 1172, 1125, 1055, 1025, 843, 761, 720 cm$^{-1}$; $^1$H NMR δδ 7.3–7.8 (m, 6H), 6.9–7.1 (q, 2 H), 3.8–4.0 (d, 3 H); MS m/e 209 (M+), 194, 181, 166.

4-(3-Methoxyphenyl)benzonitrile, 1h

Yield 27%; mp 61°-64° C.; IR 3080, 2931, 2876, 2223, 1478, 1432, 1397, 1297, 1213, 1175, 1095, 1049, 1019, 881, 786, 698, 613 cm$^{-1}$; $^1$H NMR δδ 7.6–7.8 (m, 4 H), 7.35–7.45 (t, 1 H), 7.1–7.2 (m, 2 H), 6.95 (d, 1 H), 3.9–4.0 (s, 3 H); MS m/e 209 (M+), 194, 181, 166.

EXAMPLE 2

The following general procedure was used to synthesize compounds 2a-i on roughly the same scale. Yields, physical data and spectral characterizations are given.

4-(4-Hydroxyphenyl)benzonitrile, 2i

A 100-mL Schlenk flask equipped with a stir bar was purged with N$_2$ and charged with 4-(4-methoxyphenyl)benzonitrile, 1i, (1.5 g, 7.2 mmol) and dry CH$_2$Cl$_2$ (30 mL). The reaction mixture was cooled in ice and treated with BBr$_3$ (1.22M in CH$_2$Cl$_2$, 10 mL, 12.2 mmol) via a syringe. The solution was stirred for 4 hours and then refluxed overnight.

An aliquot of the reaction mixture (0.1 mL) was added to water (10 mL), then extracted with diethyl ether (10 mL), and checked by TLC against the starting material. Another portion of BBr$_3$ was added (1.22M in CH$_2$Cl$_2$, 10 mL, 12.2 mmol), and the reaction was refluxed for another 4 hours. When the starting material was consumed, the flask was cooled and the contents were poured onto ice, causing a tan precipitate to form. The precipitate and aqueous solution were extracted with ether (100 mL, 3 times) and concentrated to yield 1.5 g of crude product (72% yield): mp 192°-194° C. (lit [2] 193°-194° C.); $^1$H NMR (CDCl$_3$) δδ 7.6–7.8 (m, 4 H), 7.4–7.5 (d, 2 H), 6.9–7.0 (d, 2 H), 5.2 (s, 1 H).

2-(2-Hydroxyphenyl)benzonitrile, 2a

Yield 82%; IR 3463, 3295, 3189, 3064, 2921, 2362, 1738, 1602, 1478, 1426, 1302, 1257, 1076, 745, 718 cm$^{-1}$; $^1$H NMR δδ 7.1–8.4 (m, 8 H), 5.4–5.6 (S, 1 H).

2-(3-Hydroxyphenyl)benzonitrile, 2b

Yield 97%; IR 3380, 2974, 2226, 1584, 1455, 1204, 878, 761, 697 cm$^{-1}$; $^1$H NMR δδ 7.3–7.8 (m, 5 H), 7.1 (m, 2 H), 6.9 (d, 1 H), 6.6–6.7 (s, 1 H).

2-(4-Hydroxyphenyl)benzonitrile, 2c

Yield 88 %; mp 176°-178° C.; IR (KBr) 3377, 3048, 2226, 1608, 1514, 1449, 1367, 1278, 1226, 1179, 1108, 820, 755, 626, 561, 502 cm$^{-1}$; $^1$H NMR δδ 7.4–7.8 (m, 6 H), 6.9–7.0 (d, 2 H), 5.2–5.4 (s, 1 H).

3-(2-Hydroxyphenyl)benzonitrile, 2d

Yield 56%; mp 120°-123° C.; IR (KBr) 3344, 2973, 2226, 1942, 1585, 1470, 1205, 1084, 878, 767 cm$^{-1}$; $^1$H NMR δδ 6.9–7.9 (m, 8 H), 5.1 (s, 1 H).

3-(3-Hydroxyphenyl)benzonitrile, 2e

Yield 80%; IR (KBr) 3377, 2233, 1709, 1587, 1471, 1412, 1309, 1215, 1164, 869, 782, 690 cm$^{-1}$; $^1$H NMR δδ 6.9–7.9 (m, 8 H), 5.0–5.9 (s, 1 H).

3-(4-Hydroxyphenyl)benzonitrile, 2f

Yield 79%; mp 135°-141° C.; IR (KBr) 3338, 3214, 2244, 1610, 1591, 1522, 1448, 1272, 1225, 837, 800 cm$^{-1}$; $^1$H NMR δδ 7.4–7.8 (m, 6 H), 6.9 (d, 2 H), 4.9 (s, 1H).

4-(2-Hydroxyphenyl)benzonitrile, 2g

Yield 72%; $^1$H NMR (CDCl$_3$) δδ 7.0–7.8 (m, 8 H), 5.2–5.4 (S, 1 H).

4-(3-Hydroxyphenyl)benzonitrile, 2h

Yield 72%; $^1$H NMR δδ 7.6–7.8 (m, 4 H), 6.9–7.45 (m, 4 H), 5.0 (s, 1 H).

EXAMPLE 3

The following general procedure was used to synthesize compounds 3a-i on roughly the same scale. Yields, physical data, and spectral characterizations are given.

4-(4-Allyloxyphenyl)benzonitrile, 3i

The crude phenol 2i [4-(4-hydroxyphenyl)-benzonitrile] was dissolved in 250 mL of anh THF and added to a 500-mL 3-neck round-bottom flask and stirred at 25° C. Potassium tert-butoxide (0.89 g, 8 mmol) was added to the solution, which turned yellow. Allyl bromide was added in excess (5.0 mL, 40 mmol) and the mixture was refluxed overnight. The THF and allyl bromide were removed by rotoevaporation. The resultant sludge was extracted 5 times with mL of hexane. This material was purified chromatographically (200 mesh Kieselgel 60, 2 % EtOAc 98% in hexane) to afford 1.0 g of white crystalline material (65%): mp 68°-69° C.; IR 3083, 3013, 2884, 2225, 1604, 1492, 1455, 1291, 1249, 1180, 995, 940, 824, 533 cm$^{-1}$; $^1$H NMR δδ 7.6–7.8 (m, 4H), 7.4–7.5 (d, 2H), 6.9–7.0 (d, 2 H), 5.9–6.0 (m, 1 H), 5.2–5.4 (m, 2 H), 4.5 (d, 2 H); MS m/e 235 (M+), 220, 207, 166. Anal. Calcd for C$_{14}$H$_{11}$NO: C, 81.68; H, 5.56. Found C, 81.56; H, 5.68.

2-(2-Allyloxyphenyl)benzonitrile, 3a

Yield 74%; bp 220° C. (0.35 torr); IR 3072, 2955, 2225, 1731, 1601, 1478, 1254, 1018, 931, 752 cm$^{-1}$; $^1$H NMR δδ 7.0–7.8 (m, 8 H), 5.9–6.1 (m, 1 H), 5.1–5.3 (m, 2 H), 4.6 (d, 2 H); MS m/e 235 (M+), 220,194,166. Anal. Calcd for C$_{14}$H$_{14}$NO: C, 81.68; H, 5.56. Found C, 81.89; H, 5.53.

2-(3-Allyloxyphenyl)benzonitrile, 3b

Yield 79%; bp 220° C. (0.5 torr); IR (neat) 3405, 3067, 2922, 2227, 1593, 1470, 1306, 1204, 1110, 1016, 929, 876, 762, 698 cm$^{-1}$; $^1$H NMR δδ 7.35–7.8 (m, 5 H), 7.1–7.2 (d, 2 H), 7.0 (d, 1 H), 6.0–6.2 (m, 1 H), 5.3–5.5 (q, 2 H), 4.6 (d, 2 H); MS m/e 235 (M+), 220, 207, 166.

2-(4-Allyloxyphenyl)benzonitrile, 3c

Yield 33%; 220° C. (0.26 torr); IR 3060, 2919, 2860, 2225, 1607, 1519, 1495, 1260, 1237, 1176, 1025, 990, 826, 767 cm$^{-1}$; $^1$H NMR δδ 7.4–7.8 (m, 6 H), 6.9–7.1 (m, 2 H), 6.0–6.2 (m, 1 H), 5.2–5.5 (m, 2 H), 4.6 (m, 2 H); MS m/e 235 (M+), 220,194,166. Anal. Calcd for C$_{14}$H$_{11}$NO: C, 81.68; H, 5.56. Found C, 81.48; H, 5.73.

3-(2-Allyloxyphenyl)benzonitrile, 3d

Yield 61%; 240° C. (0.50 torr); IR (neat) 3072, 2954, 2860, 2214, 1731, 1595, 1448, 1260, 1020, 926, 796, 690 cm$^{-1}$; $^1$H NMR δ 7.0–7.9 (m, 8 H), 5.9–6.1 (m, 1 H), 5.2–5.4 (m, 2 H), 4.6 (d, 2 H); MS m/e 235 (M+), 220, 194, 166. Anal. Calcd for C$_{14}$H$_{11}$NO: C, 81.68; H, 5.56. Found C, 81.44; H, 5.71.

3-(3-Allyloxyphenyl)benzonitrile, 3e

Yield 50%; bp 250° C. (0.35 torr); IR (neat) 4055, 3538, 3394, 3069, 29223 2867, 2230, 1735, 1649, 1573, 1470, 1300, 1213, 1166, 1097, 926, 777, 690 cm$^{-1}$; $^1$H δδ NMR 6.9–7.9 (m, 8 H), 6.0–6.2 (m, 1 H), 5.3–5.5 (q, 2 H), 4.6–4.7 (d, 2 H); MS m/e 235 (M+), 220, 207, 166.

3-(4-Allyloxyphenyl)benzonitrile, 3f

Yield 53%; mp 80°–90° C.; IR (KBr) 3036, 2966, 2907, 2848, 2226, 1607, 1507, 1425, 1249, 1178, 1025, 943, 831 cm$^{-1}$; $^1$H NMR δδ 7.4–7.8 (m, 6 H), 7.0 (d, 2 H), 6.0–6.2 (m, 1 H), 5.3–5.5 (q, 2 H), 4.6 (d, 2 H); MS m/e 235 (M+), 220, 194, 166. Anal. Calcd for C$_{14}$H$_{11}$NO: C, 81.68; H, 5.56. Found C, 81.52; H, 5.58.

4-(2-Allyloxyphenyl)benzonitrile, 3g

Yield 55%; mp 68°–69° C.; IR (KBr) 3083, 2895, 2848, 2226, 1601, 1484, 1443, 1384, 1286, 1225, 1131, 995, 925, 761 cm$^{-1}$; $^1$H NMR δδ 7.3–7.4 (m, 4 H), 6.9–7.1 (m, 4 H), 5.9–6.1 (m, 1 H), 5.2–5.4 (m, 2 H), 4.5 (d, 2 H); MS m/e 235 (M+), 220, 207, 166. Anal. Calcd for C$_{14}$H$_{11}$NO: C, 81.68; H, 5.56. Found C, 81.56; H, 5.68.

4-(3-Allyloxyphenyl)benzonitrile, 3h

Yield 55%; 250° C. (0.40 torr); IR (neat) 3401, 3072, 2919, 2865, 2225, 1924, 1603, 1478, 1297, 1203, 1013, 928, 835, 779, 690 cm$^{-1}$; $^1$H NMR δδ 7.6–7.8 (m, 4 H), 7.3–7.4 (t, 1 H), 7.1–7.2 (d, 2 H), 6.95–7.0 (d, 1 H), 6.0–6.2 (m, 1 H), 5.25–5.5 (q, 2 H); MS m/e 235 (M+), 220, 207, 166. Anal. Calcd for C$_{14}$H$_{11}$NO: C, 81.68; H, 5.56. Found C, 78.64; H, 5.54.

EXAMPLE 4

Poly[oxytrimethyldisiloxanediyl] (MW=ca. 8000), 5

Polymer 5 was synthesized in a manner similar to that previously reported, Rouse et al., *Anal. Chem.*, 60, 901 (1988) and Bayona et al., *Int. J. Environ. Anal. Chem.*, 28, 263 (1987). CH$_3$SiCl$_2$H (500 mL, 4.8 mols) was added slowly to a mixture of 1 L of ether and 500 g of ice. After the addition was complete, the aqueous and ether phases were partitioned and the ether layer was washed repeatedly with water until the water layers had a pH of ca. 7. The product mixture was concentrated at reduced pressure and distilled at 640 mm Hg to give 30 g of a colorless oil (bp 125° C.).

2,2,4,4,6,6,8,8-Octamethyl cyclotetrasiloxane (2.96 g, 10 mmol) (Aldrich) and 2,4,6,8-tetramethyl cyclosiloxane (2.4 g, 1 mmol), CF$_3$SO$_3$H (25 μL, 9.8×10−8$^m$) (Aldrich) and (n—C$_8$H$_{17}$)(CH$_3$)$_2$Si—O—Si(CH$_3$)$_2$-(n—C$_8$H$_{17}$) (0.24 g, 0. 67 mmol) were combined and stirred for 24 hours. Hexamethyldisilazane (16 μL, 9.8×10$^{-5}$ mmol) was used to neutralize the CF$_3$SO$_3$H, and the reaction mixture was extracted with three 20 mL portions of water. The oil was dissolved in CH$_2$Cl$_2$ and precipitated by adding up to 25 mL of MeOH. During the course of the fractionation, it was necessary to add 5 mL of water occasionally to obtain two layers, which could then be separated. The CH$_2$Cl$_2$ was removed by a stream of N$_2$ and stored (4.0 g yield, 75%). The reactants were added to give a calculated molecular weight of 8000.

The following general procedure was used to synthesize polymers 4a-i on roughly the same scale. $^1$H NMR characterization is given.

Polysiloxane Polymer 4i

A 50-ml Teflon TM centrifuge tube was charged with purified toluene, polymer 3i, 4-(4-Allyloxyphenyl)benzonitrile, 135 mg (1 mm) and 15 μl of a 1% w/w/w H$_2$PtCl$_6$ solution, 98% THF, 1% EtOH. The mixture was heated to reflux for 24 hours. The reaction mixture was cooled and the toluene removed with a stream of N$_2$. The crude polymer was fractionated as described for polymer 5. The fractionated polymer solution was passed through a column of Superlig TM to remove excess Pt and concentrated with a stream of N$_2$: $^1$H NMR δδ 6.9–7.9 (m, 8 H), 3.85–4.0 (s, 2 H), 1.7–2.0 (s, 2 H), 0.5–0.8 (s, 2 H), 0.0–0.2 (s, 9 H).

Polysiloxane polymer 4a $^1$H NMR δδ 6.9–7.8 (m, 8H), 3.8–4.0 (s, 2H), 1.6–1.8 (s, 2H), 0.4–0.6 (s, 2H), 0.0–0.2 (s, 9H).

Polysiloxane polymer 4b $^1$H NMR δδ 7.3–7.8. (m, 4 H), 6.8–7.1 (m, 4 H) 3.8–4.0 (s, 2 H), 1.7–1.9 (s, 2 H), 0.6–0.7 (s, 2 H), 0.0–0.2 (s, 9 H).

Polysiloxane polymer 4c $^1$H NMR δδ 7.2–7.8 (m, 6 H), 6.8–7.1 (s, 2 H), 3.8–4.0 (s, 2 H), 1.7–1.9 (s, 2 H), 0.6–0.8 (s, 2 H), 0.0–0.2 (s, 9 H).

Polysiloxane polymer 4d $^1$H NMR δδ 6.7–7.8. (m, 8 H), 3.8–3.9 (s, 2 H), 1.7–1.9 (s, 2 H), 0.6–0.8 (s, 2 H), 0.0–0.2 (s, 9 H).

Polysiloxane polymer 4e $^1$H NMR δδ 6.9–7.9 (m, 8 H), 3.8–4.0 (s, 2 H), 1.7–2.0 (s, 2H), 0.6–0.8 (s, 2 H), 0.0–0.2 (s, 9 H).

Polysiloxane polymer 4f $^1$H NMR δδ 6.7–7.8. (m, 8 H), 3.8–3.9 (s, 2 H), 1.7–1.9 (s, 2 H), 0.6–0.8 (s, 2 H), 0.0–0.2 (s, 9 H).

Polysiloxane polymer 4g $^1$H NMR δδ 6.9–7.9 (m, 8 H), 3.85–4.0 (s, 2 H), 1.7–2.0 (s, 2 H), 0.5–0.8 (s, 2 H), 0.0–0.2 (s, 9 H).

Polysiloxane polymer 4h $^1$H NMR δδ 7.45–7.7. (s, 4 H), 6.65–7.2 (d, 4 H) 3.7–4.0 (s, 2 H), 1.7–1.9 (s, 2 H), 0.5–0.7 (s, 2 H), 0.0–0.2 (s, 9 H).

The polysiloxane cyano-substitutedbiphenyl polymers of Examples 4a–4h were applied as stationary phases in gas-liquid chromatographic columns. Typically these columns may be about 10–30 meters long, about 50–500 micrometers in inner diameter and be coated with a polymer film having a thickness of between about 0.05 and 0.50 μm. In the present examples, an untreated fused silica capillary column, about 20 meters long and about 0.2 millimeters in inner diameter, was statically coated with about a 0.15 μm polymer film.

The fused silica capillaries are prepared for chromatographic analysis in the following manner. First, the fused silica capillaries are purged with dry nitrogen gas at about 250° C. for about two hours before use. The polymer is dissolved in about 5 ml of dichloromethane at about 35° C. at a sufficient concentration to provide a film thickness of about 0.15 μm by the static coating method. Before filling the fused silica capillaries, the coating solution is carefully filtered through a 2 μm metal filter device. The columns are then coated with the polymer and purged with nitrogen gas for about 30 minutes to remove all traces of solvent. The coating or stationary phase thus applied to the fused silica capillaries is next preferably cross-linked using azo-t-butane as free radical initiator.

To achieve such cross-linking, the coated columns are purged with azo-t-butane saturated nitrogen gas. The column ends are then sealed, and the columns are heated from about 40° C. to about 220° C. by increasing the temperature at the rate of about 40° C. per minute, and holding at the final temperature of about 220° C. for about 30–40 minutes. After cross-linking, the columns are purged with dry nitrogen gas at room temperature to remove excess azo-t-butane and reaction by-products. Such a cross-linking procedure provides cross-linkages between the methyl and/or methylene functional groups in the polymer. Of course, it will be recognized that other free radical initiators can be used instead of azo-t-butane and that the cross-linking reactions can be performed statically in a sealed column as set forth in this procedure, or dynamically where the column is purged with an inert gas during the reaction.

Cross-linking of the polymeric stationary phase has several advantages. First, cross-linking the polymeric stationary phase within the column helps to prevent washout of the polymer after repeated use.

Additionally, the stationary phases of the present invention can be used in supercritical fluid chromatography where even higher demands are put on the cross-linked polymers. Such cross-linked polymers have been found to withstand the strong solubilizing properties of supercritical fluids. Thus, the present invention has found particular utility in supercritical fluid chromatography applications.

Chromatographic Results

It is difficult to compare polarities of the conventional phases and the newly developed CBP phases. From the chemical compositions of the reported OH-terminated phases it is evident that they are mainly apolar or medium polar. This is based on the fact that one of the most polar OH-terminated phases contains only 33% cyanopropyl substitution, Blum et al., *J. High Resolut. Chromatogr./Chromatogr. Commun.*, 11, 148 (1988). Moreover, during high temperature treatment required for the preparation of these columns, the stationary phase may partially lose its original polarity due to chemical reactions taking place. Since the CBP phases were found to have higher polarities than that of the 50% cyanopropylpolysiloxane phase, they are also more polar in comparison with the reported OH-terminated phases. The synthesized cyanobiphenylpolysiloxane (CBP) polymers were tested as stationary phases for gas chromatography (GC). Capillary gas chromatography (GC) columns coated with each of these polymers were prepared using cyano-deactivated fused silica tubing of 0.2-mm i.d., Markides et al., *J. High Resolut. Chromatogr./Chromatogr. Commun.*, 8, 741 (1985). Each column had a length of 7.0 meters.

The columns were coated by the static technique. For this, the necessary calculations were performed based on the criteria set forth in Sumpter et al., *J. Chromatogr.*, 517, 503 (1990). Dichloromethane was used as the coating solvent for all of the copolymers except for polymer 4a for which acetone was used as the solvent. The concentration of the coating solution was selected in such a way that the coated stationary phase had a film thickness of 0.2 μm. The stationary phases in the coated columns were cross-linked using azo-t-butane as a free radical initiator. The columns were conditioned under continuous helium purge and temperature programming from 40° C. to 280° C. at 4° C. min$^{-1}$, followed by holding the column at the final temperature for 10 hours. Three reference columns of the same dimensions were prepared by the same procedure using commercially available standard stationary phases that differ in their chromatographic polarities: SE-54, Carbowax 20M, and 50% cyanopropylpolysiloxane.

The newly synthesized polysiloxane cyano-substituted biphenyl polymer (CBP) stationary phases were found to be easily soluble in dichloromethane. Prepared columns were tested for efficiency, thermostability, polarity, and cross-linking ability. Results obtained on cyano-substituted biphenyl polymer columns were compared to those obtained on the standard phase columns.

The CBP columns showed excellent chromatographic efficiencies, with the exception of the one in which 4a was used as the stationary phase. For example, a column prepared with 4i showed an efficiency of 5100 theoretical plates per meter, which corresponds to a coating efficiency of 89%. Efficiency measurements were carried out at 150° C. using n-nonadecane as a solute.

The new phases contained approximately 2 % of cross-linkable octyl groups as substituents. The cross-linking efficiencies of the phases, determined by the ratio of the capacity factor values for methyl stearate at 170° C. before and after solvent rinsing of the cross-linked columns, were found to be over 95%.

The polarities of the CBP phases were estimated based on a method, Sidisky et al., *J. High Resolut. Chromatogr./Chromatogr. Commun.*, 14, 191 (1991). Polarity values were estimated from the rate of change of the slopes of ECL plots with temperature as described in Negishi et al. supra. Results show that the polarities of all nine 25% CBP phases are higher than those of SE-54, Carbowax 20M, and 50% cyanopropylpolysiloxane phases. Polymers 4h and 4i showed the highest and the lowest chromatographic polarities, respectively.

The characteristics of the newly synthesized cyanobiphenylpolysiloxane stationary phases are presented in Table I.

TABLE I

Structural characteristics of the newly synthesized CBP stationary phases.

| Stationary phase | Position of the cyano group | Position of the allyloxy group |
|---|---|---|
| 1-Polymer 4a | ortho | ortho |
| 2-Polymer 4b | ortho | meta |
| 3-Polymer 4c | ortho | para |
| 4-Polymer 4d | meta | ortho |
| 5-Polymer 4e | meta | meta |
| 6-Polymer 4f | meta | para |
| 7-Polymer 4g | para | ortho |
| 8-Polymer 4h | para | meta |
| 9-Polymer 4i | para | para |

All of the cyanobiphenyl phases were prepared with 25% substitution of cyanobiphenyl moieties on the polysiloxane backbone. Physically, these phases were highly viscous, clear, gummy materials. All of them were readily soluble in dichloromethane except for the one in which both cyano and allyloxy groups were present in the ortho positions of the biphenyl rings (Stationary Phase #1/Polymer 4a). For this phase, acetone was found to be a good solvent.

The experimentally measured chromatographic characteristics of nine different cyanobiphenyl columns as well as those of three commercial phase columns are presented in Table II.

TABLE II

Chromatographic properties of cyanobiphenyl and commercially available reference phases.

| Stationary phase | Column Efficiency (plates m$^{-1}$) | Crosslinking efficiency (%) | Selectivity$^a$ ($a$) | Upper temperature limit (C°.) |
|---|---|---|---|---|
| 1 | 2100 | 95.2 | 1.037 | 260 |
| 2 | 3700 | 98.1 | 1.034 | 290 |
| 3 | 4200 | 96.5 | 1.048 | 290 |
| 4 | 3600 | 90.4 | 1.051 | 300 |
| 5 | 4700 | 95.8 | 1.041 | 300 |
| 6 | 4900 | 95.2 | 1.042 | 300 |
| 7 | 3900 | 96.3 | 1.044 | 290 |
| 8 | 4400 | 94.8 | 1.048 | 300 |
| 9 | 5100 | 95.2 | 1.135 | 300 |
| SE-54 | 5200 | 97.6 | 1.015 | 350 |
| Carbowax 20M | 2600 | — | 1.028 | 250 |
| 50% cyanopropyl | 3500 | 94 | 1.048 | 280 |

$^a$Solutes are isomeric xylene derivatives

From the presented data it is evident that the cyanobiphenyl columns (with the exception of the one prepared by using Stationary Phase #1) are highly efficient. For example, a 200-μm i.d. cyanobiphenyl Stationary Phase #9 (Polymer 4i) column produced an efficiency of 5100 plates m$^{-1}$ which corresponded to a coating efficiency of 89%. This value is similar to the efficiency of a nonpolar SE-54 phase, but significantly higher than the efficiencies of polar Carbowax 20M or 50% cyanopropyl columns prepared by the same procedure.

The cyanobiphenyl phases contained approximately 2% octyl group substitution which allowed efficient crosslinking of the stationary phase films using azo-t-butane as a free radical initiator. The crosslinking efficiencies of the new phases were estimated from the ratios of the capacity factor values for methyl stearate before and after rinsing the column with 5 mL of dichloromethane. For the cyanobiphenyl phases, the crosslinking efficiencies were found to be over 95%. These values are similar to those obtained for SE-54 (97%) or crosslinkable 50% substituted cyanopropyl phases (94%).

The thermal stabilities of the new phases were evaluated through step-wise conditioning of the columns using 10° C. temperature increments between chromatographic evaluations. After each temperature increment, the column was conditioned for 10 h. Methyl lignocerate was used as a test solute for which the capacity factor values were determined at each step both before and after conditioning. When conditioning resulted in a more than 5% reduction in the capacity factor value compared to that before conditioning, the temperature of the preceding step was taken to be the upper operating temperature limit for the given phase.

The new stationary phases were found to be highly selective toward structural and positional isomers containing benzene rings. Column 4 of Table III presents selectivity factor (a) values for two dodecylxylene isomers measured at 180° C. As can be seen, the selectivity factor values are much higher for the cyanobiphenyl phases than for SE-54 or Carbowax 20M. The highest selectivity was obtained for cyanobiphenyl #4 (a = 1.05 1), which is higher than that of the 50% cyanopropyl phase ($\alpha a = 1.048$).

Figure 1B:
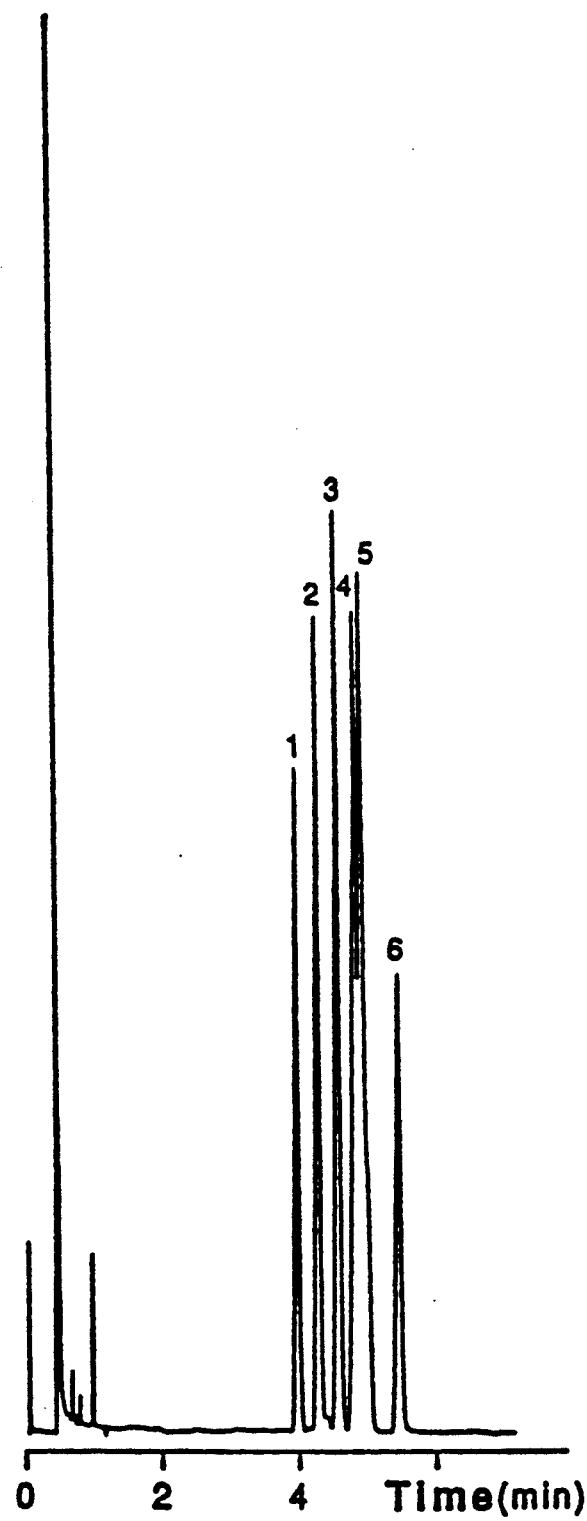
Figure 1C:
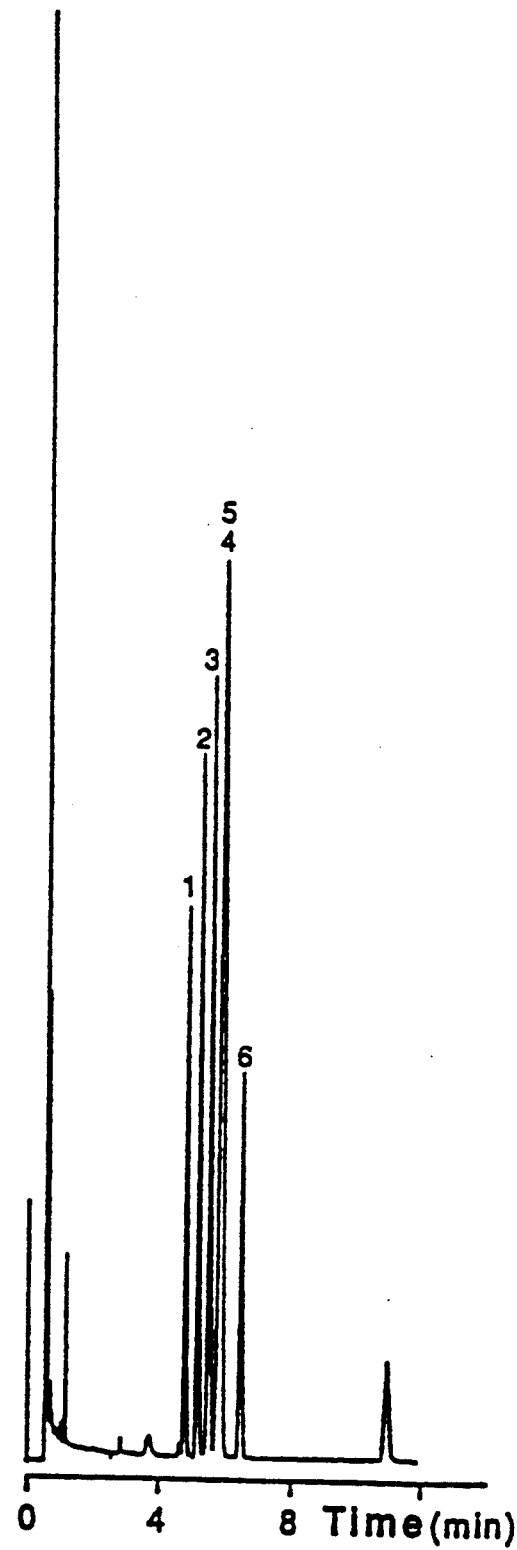

The high selectivity of the cyanobiphenyl phases allowed complete resolution of all six dodecylxylene isomers as is illustrated in FIG. 1A. For comparison, chromatograms of the same isomers obtained on a Carbowax 20M and SE-54 columns of the same dimensions are presented in FIGS. 1B and 1C respectively. The operating conditions were as follows: 10-m×0.2-mm i.d. cyano-deactivated fused silica columns; 180° C. isothermal; helium carrier gas; FID; split injection (200:1).

Figure 2:
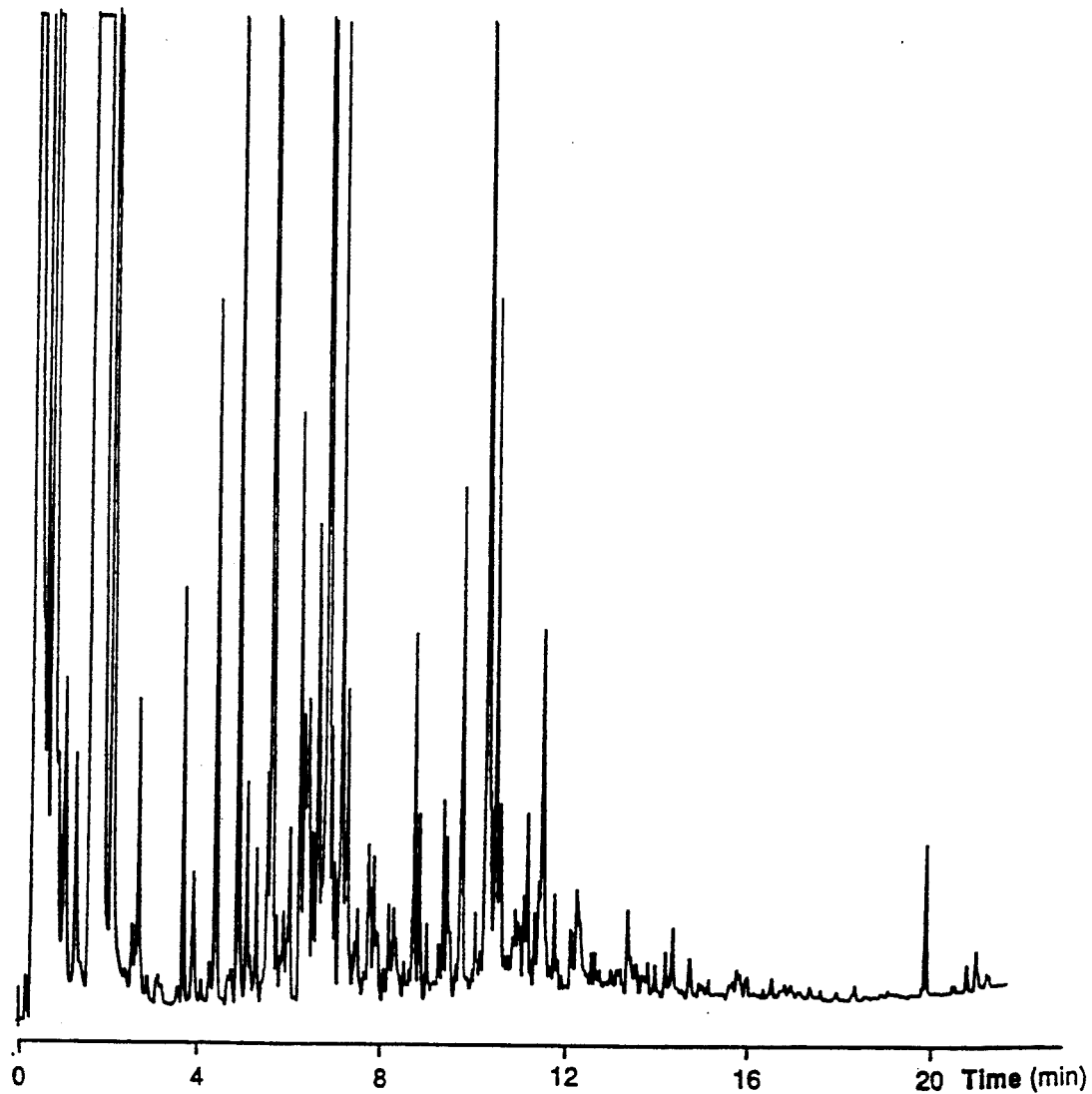
FIG. 2: Gas chromatogram of the separation of a eucalyptus oil sample on a short column coated with cyanobiphenyl stationary phase.

As can be seen, peaks 4 and 5 almost coeluted on the SE-54 column, were partially resolved on the Carbowax 20M column, while they are baseline separated on the cyanobiphenyl column. Due to high efficiencies and selectivities, short CBP columns can be used for fast analysis of complex mixtures. FIG. 2 represents a gas chromatography (GC) separation of a sample of eucalyptus oil on a 5.5-m cyanobiphenyl column. The operating conditions were: 5.5-m×0.2-mm i.d. cyano-deactivated fused silica column; temperature program from 65° C. at 8° C. min$^{-1}$; helium carrier gas; FID; split injection (22:1).

Figure 3A:
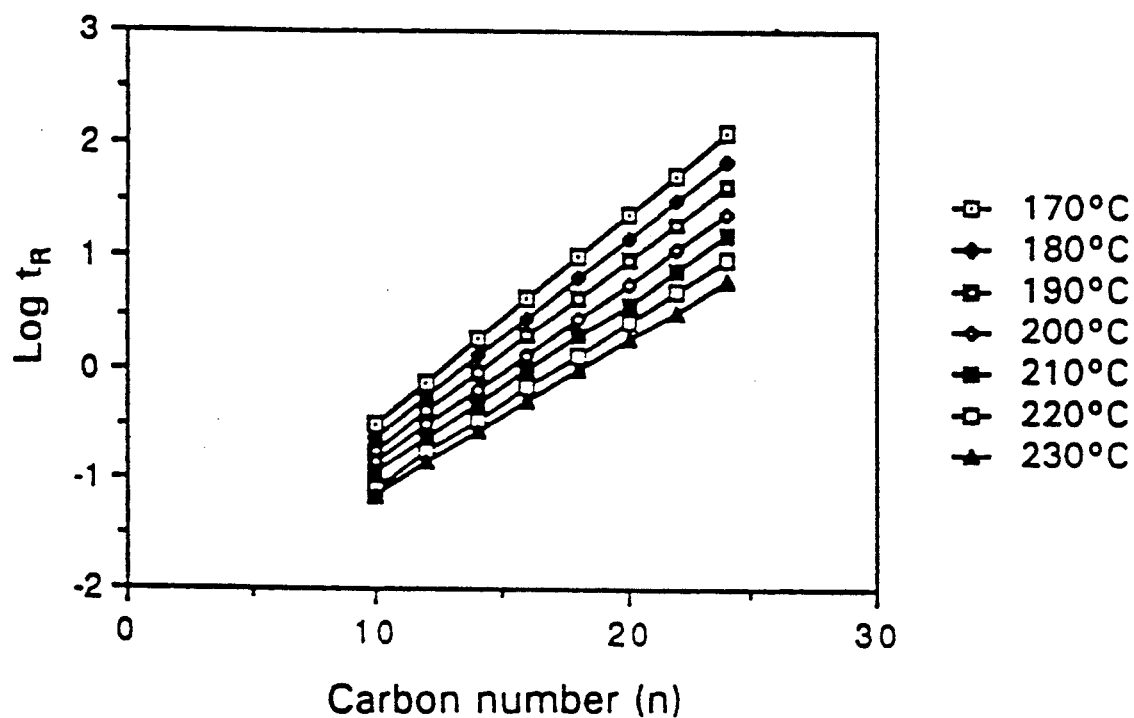
FIGS. 3A and 3B represent log $t'_R$ vs. n plot for fatty acid methyl esters (FAMEs) on (A) cyanobiphenyl and (B) Carbowax 20M stationary phases at different temperatures.
Figure 3B:
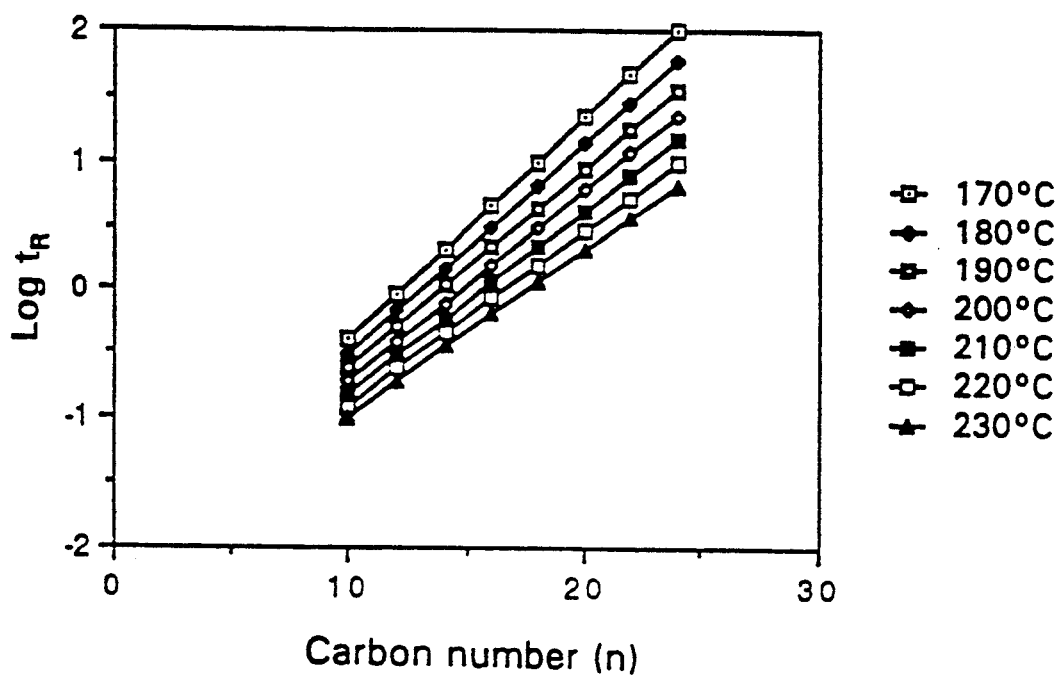

The polarities of the new stationary phases were evaluated following a procedure reported by Sidisky and Ridley in a recent publication, Sidisky and Ridley J. High Resolut. Chromatogr./Chromatogr. Commun. 14, 191 (1991). The classical Rohrschneider/McReynolds methods, Rohrschneider, J. Chromatogr. 22, 6 (1966) and McReynolds, J. Chromatogr. Sci. 8, 685 (1970), were not applied for this purpose due to recent criticism by different authors, C. F. Poole and S. K. Poole, Chem. Rev. 89, 377 (1989) and Poole et al., LC-GC 6, 400 (1988). In their work Sidisky and Ridley observed a correlation between the stationary phase polarity and the rate of change of the slope of log $t'_R$ vs. n plots for fatty acid methyl esters (FAMEs) ($t'_R$ is the corrected retention time and n is the number of carbon atoms in the homologous compounds). FIG. 3 represents log $t'_R$ vs. n plots for one of the cyanobiphenyl phases and the carbowax 20M phase. The operating conditions were: 5.5-m×0.2-mm i.d. cyano-deactivated fused silica columns; helium carrier gas; FID; split injection (200:1). As is known, this is a linear relationship (Log $t'_R = a + b\, n$) and the experimental data fitted into straight lines with correlation coefficients of 1.00 for all phases studied.

Table III represents experimentally obtained values of the parameters "a" and "b" as well as two other quantities, $\Delta b/\Delta t$ and $\Delta G^{CH_2}$, related to the parameter "b".

TABLE III

Physicochemical data obtained from log $t'_R$ vs. n plots (Log $t'_R = a + b\, n$) for cyanobiphenyl and commercially available reference phases obtained at 200° C.

| Stationary phase | Intercept (a) | Slope (b) | $\Delta b/\Delta t \times (10^4)^a$ | $-\Delta G^{CH_2}$ (Cal. mol$^{-1}$) |
|---|---|---|---|---|
| 1 | −2.663 | 0.1607 | 7.4 | 347.5 |
| 2 | −2.4253 | 0.1588 | 7.1 | 343.4 |
| 3 | −2.3868 | 0.1577 | 7.2 | 341.0 |
| 4 | −2.4951 | 0.1591 | 7.0 | 344.0 |
| 5 | −2.4455 | 0.1605 | 8.0 | 347.1 |
| 6 | −2.4545 | 0.1614 | 7.0 | 349.0 |
| 7 | −2.4463 | 0.1603 | 6.9 | 346.6 |
| 8 | −3.1622 | 0.1577 | 8.3 | 341.0 |
| 9 | −2.6491 | 0.1581 | 7.2 | 341.9 |
| SE-54 | −2.4834 | 0.1626 | 6.6 | 351.6 |
| Carbowax 20M | −2.1857 | 0.1419 | 6.8 | 306.8 |
| 50% cyanopropyl | −2.2066 | 0.1255 | 7.2 | 271.4 |

$^a$Solutes are isomeric xylene derivatives

Parameter "a" was interpreted as the retention contribution of the functional group of the solute molecule, Rohrschneider, *Adv. Chromatogr.* 4, 333 (1967). The quantity $\Delta b/\Delta t$ represents the rate of change of the slope of log $t'_R$ vs. n plots with temperature. The parameter "b" is related to the free energy of dissolution of a methylene group ($\Delta G^{CH_2}$) by the following equation [Golovnya and Misharina, *Chromatographia* 10, 658 (1977)]: $\Delta G^{CH_2} = 2.3\, R\, T\, b$ (1) where R is the universal gas constant and T is the temperature (K). $\Delta G^{CH_2}$ is a measure of the dispersion interaction of the stationary phase with the solute [Golovnya and Misharina, *J. High Resolut. Chromatogr./Chromatogr. Commun.* 3, 4 (1980)]. From the $\Delta G^{CH_2}$ data presented in Table III it follows that the dispersion interactions in the new stationary phases are stronger than in Carbowax 20M or in the 50% cyanopropyl phase. However, as was emphasized by Golovnya and Misharina [*J. High Resolut. Chromatogr./Chromatogr. Commun.* 3, 51 (1980)], stronger dispersion interactions do not necessarily mean lower polarity of the stationary phase. Polarity should be considered as the ability of the stationary phase to undergo different types of molecular interactions with the solutes, and dispersion is just one type of such interaction.

Sidisky and Ridley [*J. High Resolut. Chromatogr./Chromatogr. Commun.* 14, 191 (1991)] showed a positive correlation between the quantity $\Delta b/\Delta t$ and the polarity of the stationary phase. Column 4 of Table III represents the $\Delta b/\Delta t$ values for different phases at 200° C. If this parameter can be taken to be an estimate of the stationary phase polarity, then it follows from the presented data that some of the cyanobiphenyl phases possess polarity values higher than carbowax 20M or 50% cyanopropyl. According to this criterion, cyanobiphenyl phase #8 (Polymer 4h) showed the highest polarity among the phases studied. However, one should be careful with the comparison of stationary phase polarities as it depends on temperature. The quantity $\Delta b/\Delta t$ is expected to give the average polarity of the stationary phase for the given temperature interval. Our experimental results show that it depends both on the absolute value of $\Delta t$ and the magnitude of the boundary temperature values for this interval. This is a consequence of nonlinear dependence of parameter "b" on temperature (equation 1). For this reason, in comparing stationary phase polarities by this method it is important that $\Delta b/\Delta t$ values be determined by using $\Delta t$ values of the same magnitude and location in the temperature scale.

Figure 4A:
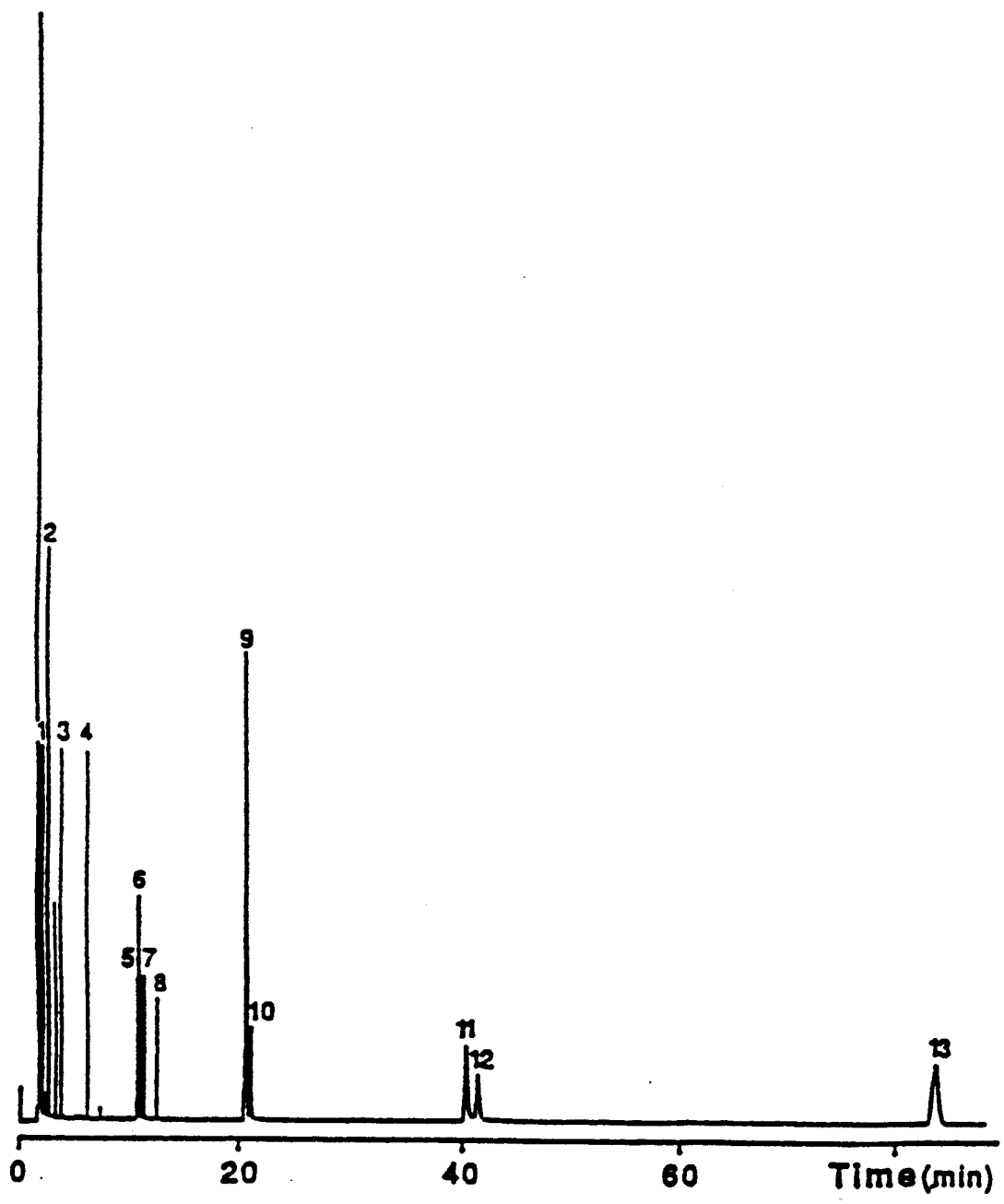
FIGS. 4A, 4B, and 4C represent gas chromatograms illustrating the different elution orders of FAMEs on cyanobiphenyl, 50% biphenyl, and SE-54 columns respectively.
Figure 4B:
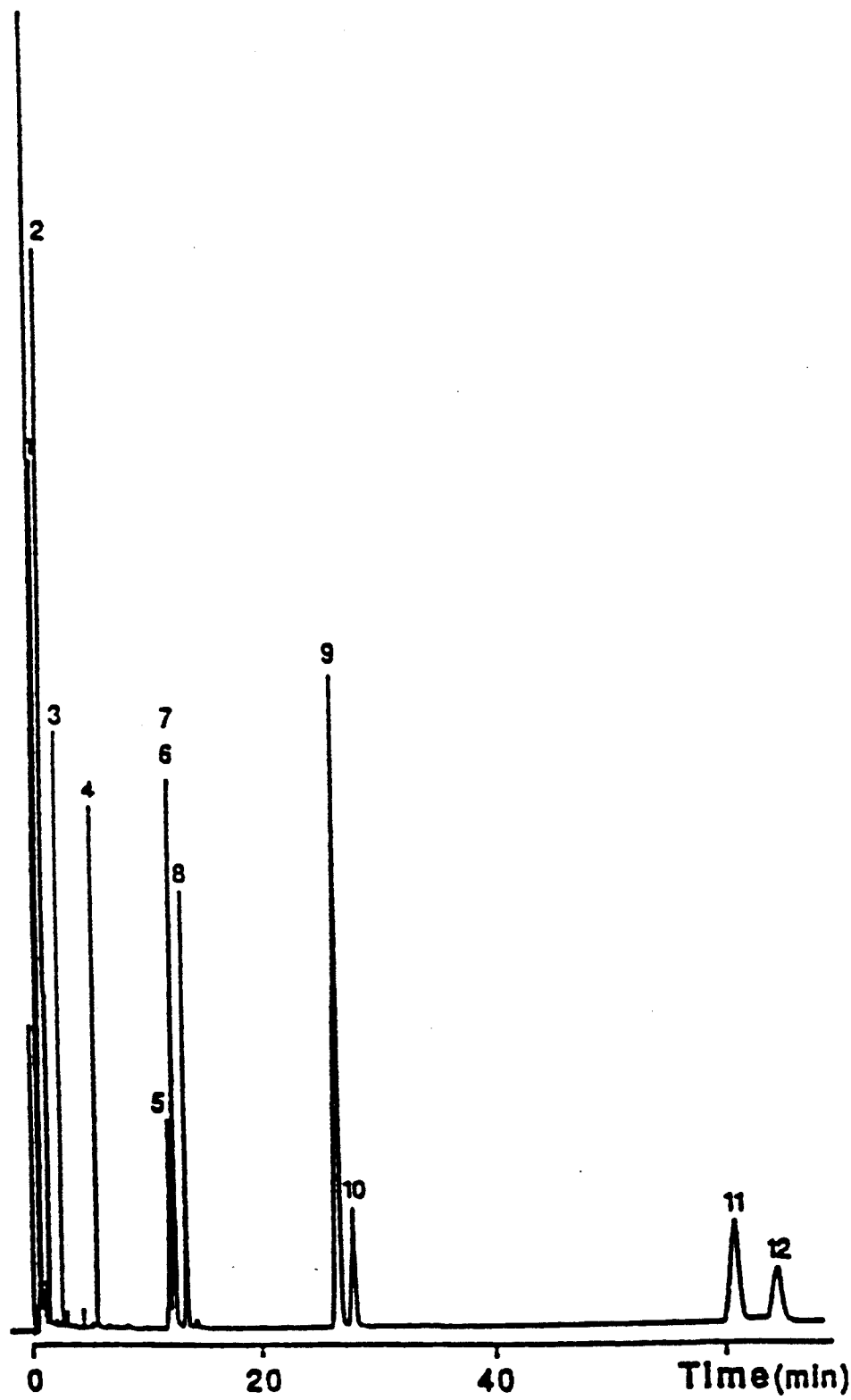
Figure 4C:
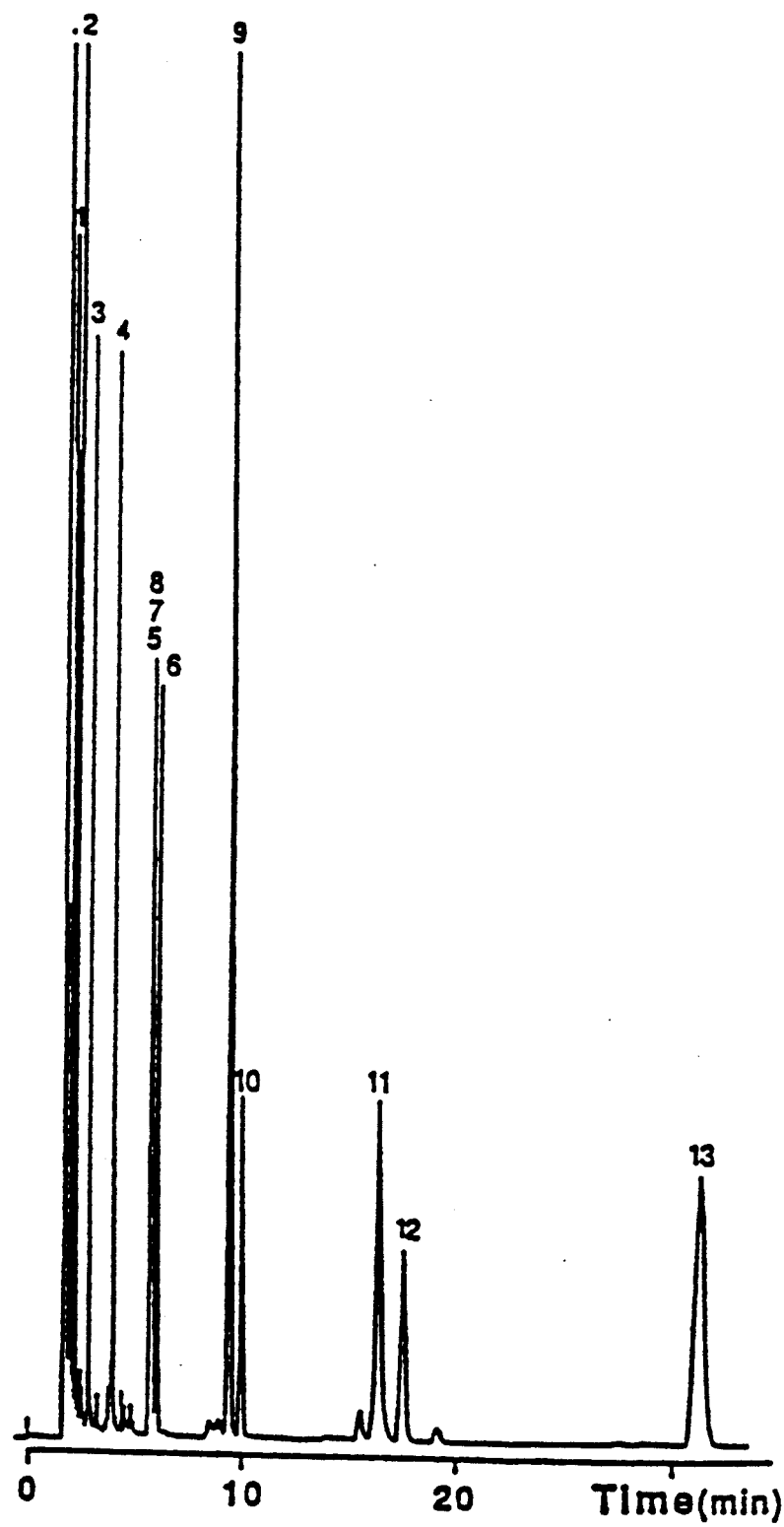

FIG. 4 represents gas chromatograms of some saturated and unsaturated fatty acid methyl esters on three different columns: (A) cyanobiphenyl Stationary Phase #5 (Polymer 4e), (B) 50% biphenyl, and (C) SE-54. The operating conditions were: 30-m×0.2-mm i.d. fused silica columns, 200° C. isothermal; helium carrier gas; FID; split injection (200:1). Peak identifications: (1) methyl decanoate, (2) methyl laurate, (3) methyl myristate, (4) methyl palmitate, (5) methyl oleate, (6) methyl stearate, (7) methyl linoleate, (8) methyl linolenate, (9) methyl eicosenoate, (10) methyl arachidate, (11) methyl erucate, (12) methyl behenate, and (13) methyl lignocerate.

It can be observed from these chromatograms that the elution orders of the FAMEs are different on these columns. Following is a comparison of the elution orders of $C_{18}$ FAMEs. On the nonpolar SE-54 column, all of the unsaturated FAMEs ($C_{18:1}$, $C_{18:2}$, and $C_{18:3}$) are eluted before the corresponding saturated FAME $C_{18:0}$. On the cyanobiphenyl phases the elution order was $C_{18:1}$, $C_{18:0}$, $C_{18:2}$, and $C_{18:3}$. Another interesting observation is that on the SE-54 column the retention time of unsaturated FAME $C_{18:2}$ was shorter than $C_{18:1}$, while retention times increased with the degree of unsaturation on both the biphenyl and cyanobiphenyl columns.

Figure 5A:
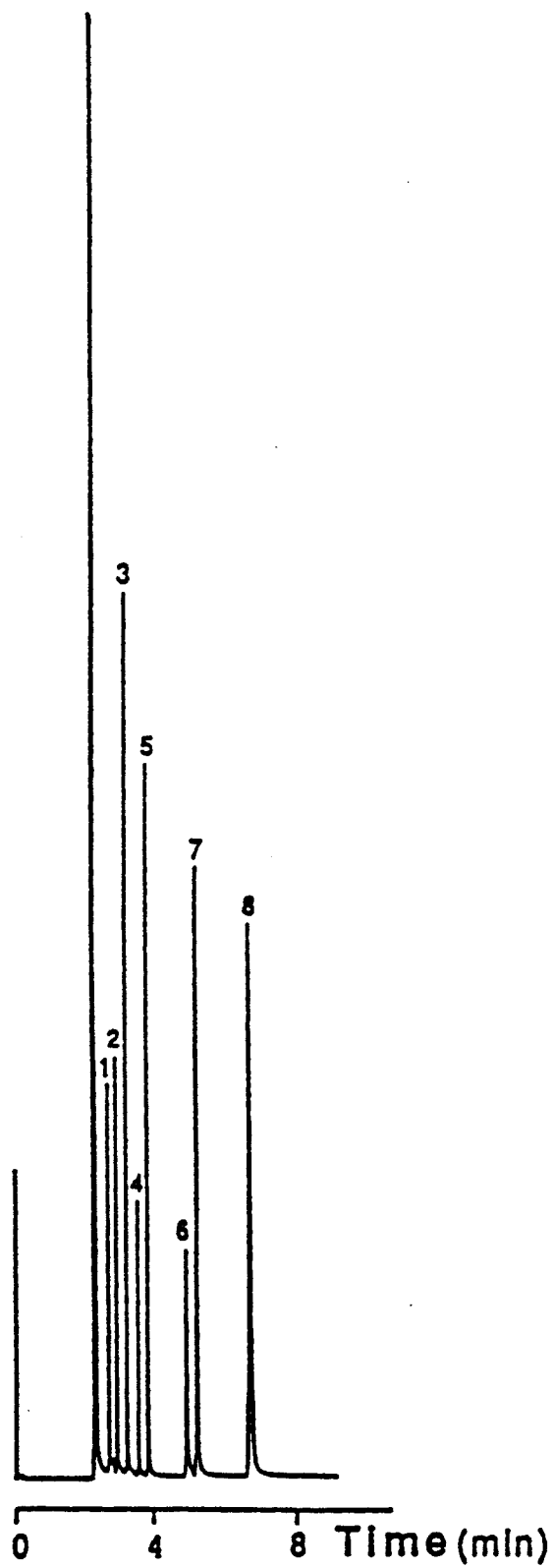
FIGS. 5A and 5B are gas chromatograms illustrating the elution orders of a polar test mixture cyanobiphenyl and SE-54 columns respectively.
Figure 5B:
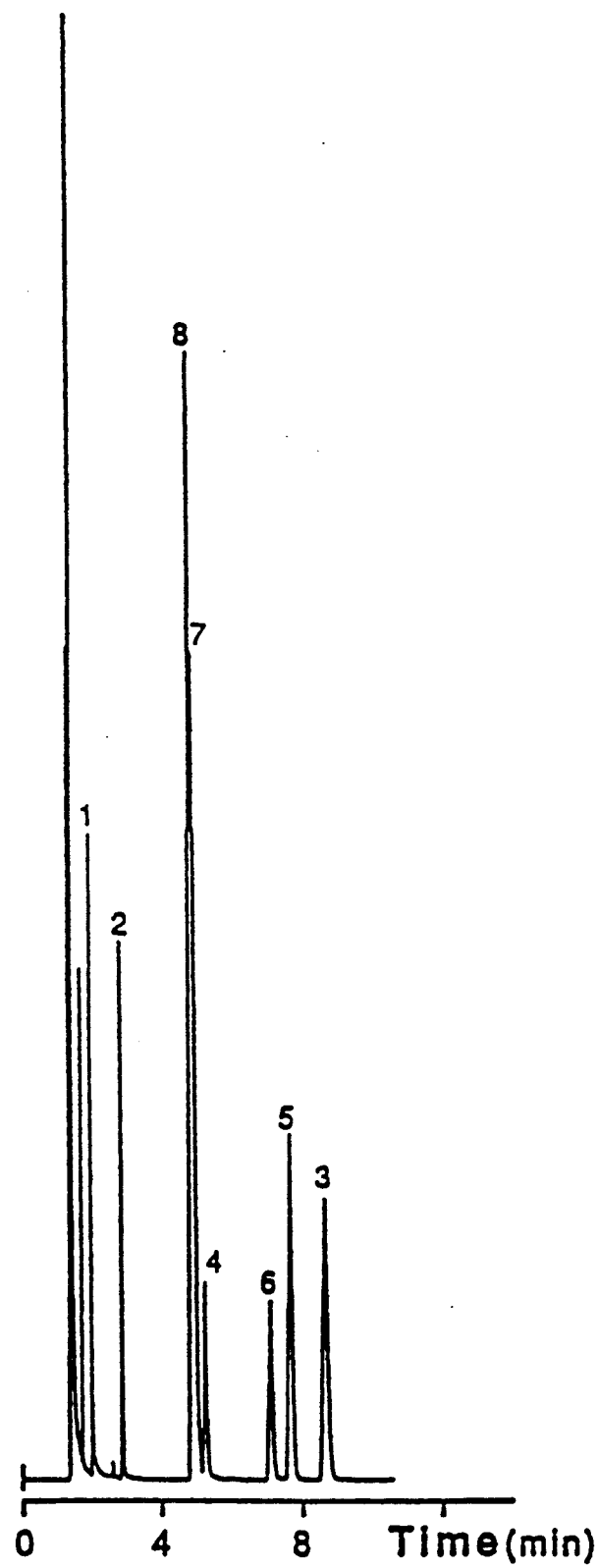

FIG. 5 shows gas chromatograms of a test mixture containing compounds which represent different types of molecular interactions obtained on used (A) cyanobiphenyl and (B) SE-54 columns. The operating conditions were: 30-m×0.2-mm i.d. fused silica capillary columns; 80° C. isothermal; helium carrier gas; FID; split injection (200:1). Peak identifications: (1) pyridine, (2) 1-hexanol, (3) pentyl ether, (4) 2-octanone, (5) n-butylbenzene, (6) 1-nitrohexane, (7) aniline, and (8) phenol.

As can be seen, the elution orders of some of the components of this mixture are different on the used phases. On cyanobiphenyl phases, for example, pentyl ether and n-butylbenzene have short retention times, while on the SE-54 column they are the most retained among the solutes. Aniline and phenol that are strongly retained on the cyanobiphenyl columns, elute quickly from the SE-54 column. As is known, Li et al., *Anal. Chem.* 64, 210 (1992), aniline and phenol are characterized by the ability to participate practically in all types of molecular interactions. High retention of these solutes on cyanobiphenyl phases is an indicative of the high polarities of the new phases.

An interesting phenomenon was observed regarding temperature dependence of the selectivities of the cyanobiphenyl phases toward the solute pair, 2-octanone/n-butylbenzene. Data are presented in Table IV.

TABLE IV

Selectivity factors (α) at different temperatures for the 2-octanone/butylbenzene solute pair on cyanobiphenyl, SE-54, and cyanopropyl columns[a].

| Stationary Phase | Temperature | | | |
|---|---|---|---|---|
| | 70° C. | 80° C. | 90° C. | 100° C. |
| CBP #1 | 1.116 | 1.147 | 1.156 | 1.186 |
| CBP #2 | 1.029 | 1.048 | 1.074 | 1.086 |
| CBP #3 | 1.003 | 1.027 | 1.050 | 1.063 |
| CBP #4 | 1.035 | 1.056 | 1.078 | 1.106 |
| CBP #5 | 1.137 | 1.151 | 1.169 | 1.178 |
| CBP #6 | 1.141 | 1.164 | 1.172 | 1.187 |
| CBP #7 | 1.178 | 1.187 | 1.219 | 1.222 |
| CBP #8 | 1.138 | 1.145 | 1.158 | 1.167 |
| CBP #9 | 1.085 | 1.105 | 1.113 | 1.138 |
| SE-54 | 1.561 | 1.547 | 1.539 | 1.523 |
| 50% Cyanopropyl | 1.233 | 1.222 | 1.215 | 1.200 |

[a]Columns dimensions: 7-m × 0.2 mm i.d., film thickness 0.2 μm.

As is known, the selectivity of a stationary phases usually decreases with an increase in temperature. From the data presented in Table IV, it can be observed that for this solute pair the predicted trend holds true for both SE-54 and the cyanopropyl phase. However, for all nine cyanobiphenyl phases selectivity increased with an increase in temperature for the temperature range investigated. An analogous increase in selectivity with increase in temperature was also observed for the solute pair, aniline/nitrohexane.

Figure 6A:
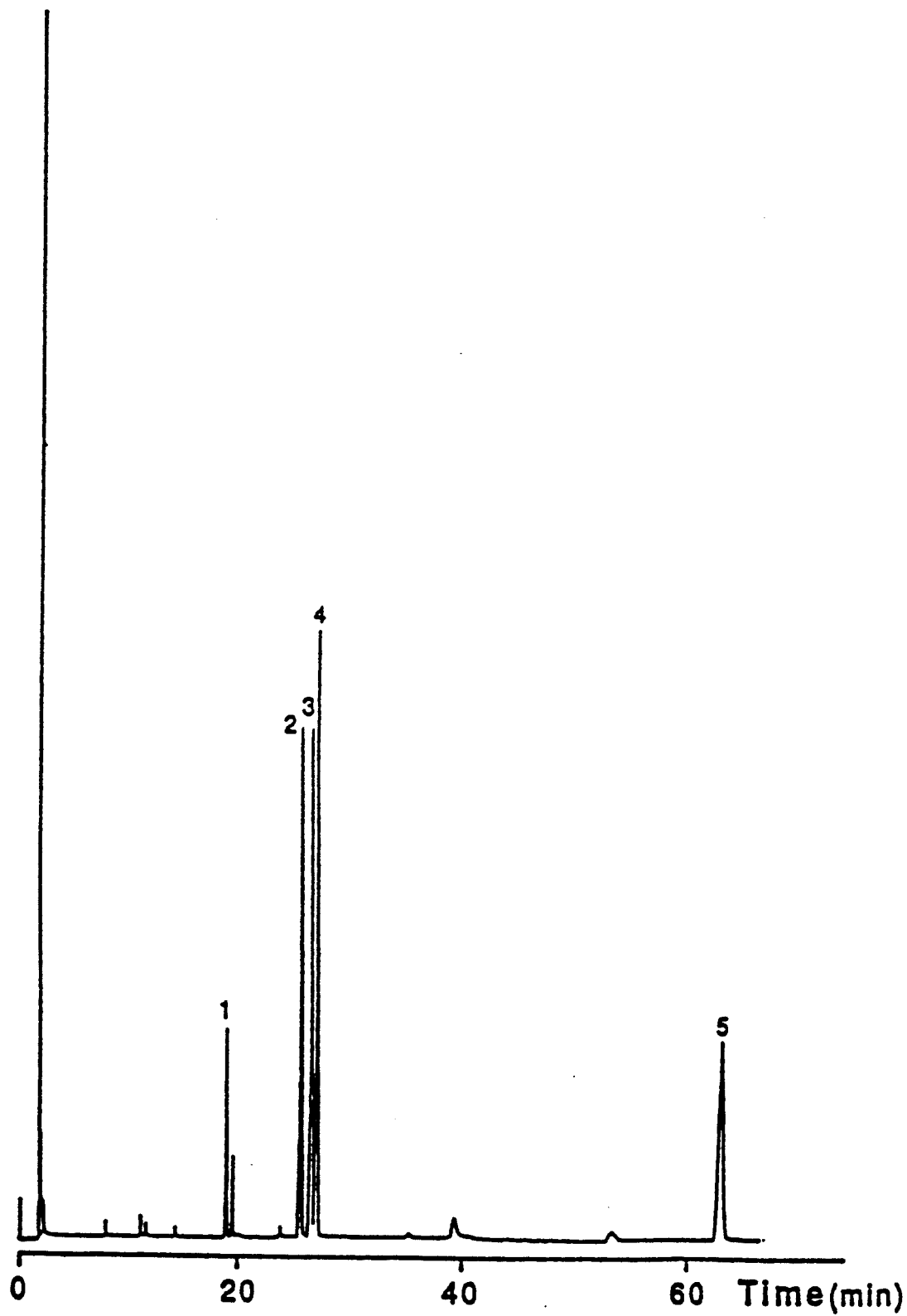
FIGS. 6A and 6B illustrate gas chromatographic separation of five structural isomers of four-ring polycyclic aromatic hydrocarbons on cyanobiphenyl (A) and SE-54 columns (B).
Figure 6B:
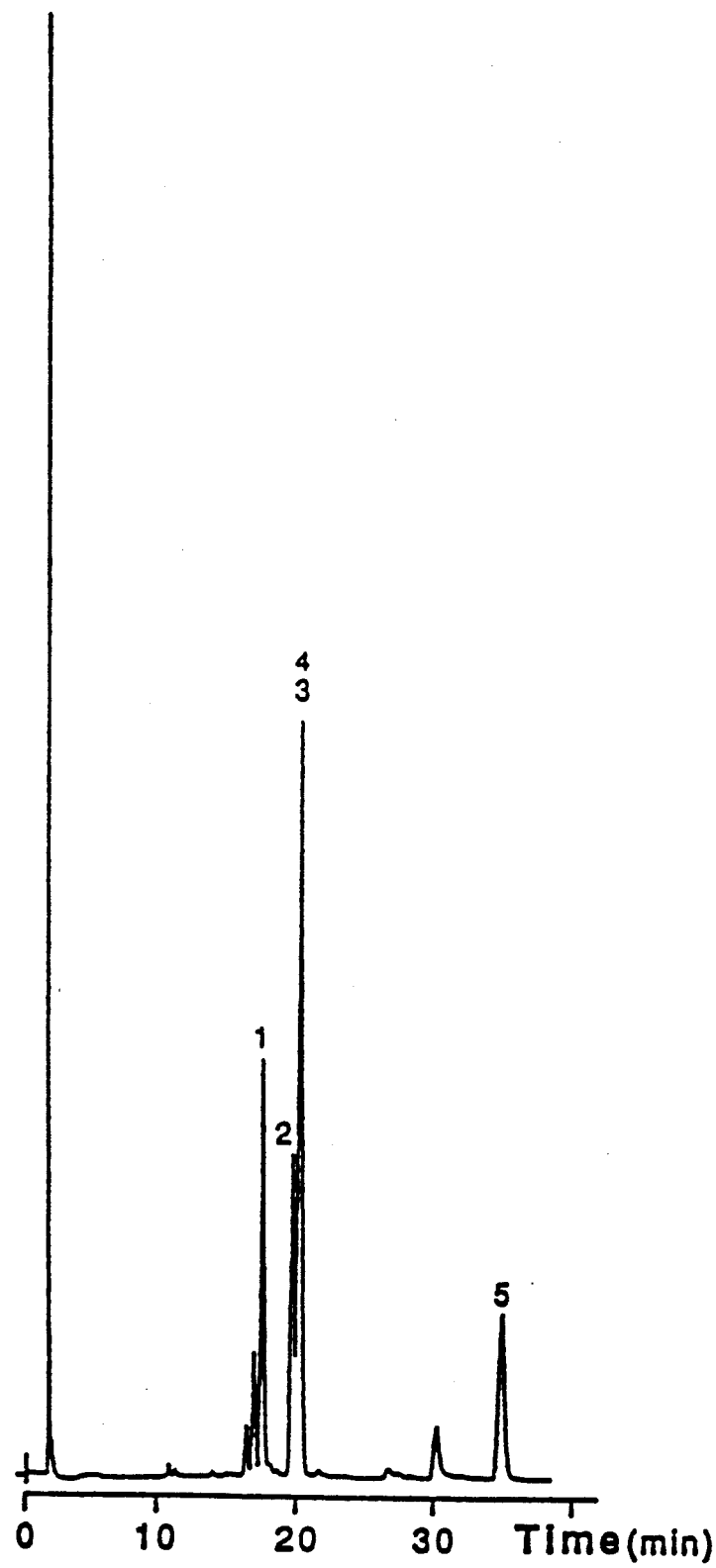

The new cyanobiphenyl phases showed excellent shape/size selectivity for polycyclic aromatic hydrocarbon (PAH) isomers. FIG. 6 shows gas chromatography (GC) separation of all five isomers of four-ring PAHs. The operating conditions were: 30-m×0.2-mm i.d. fused silica columns; 250° C. isothermal; helium carrier gas; FID; split injection (200:1). Peak identifications: (1) Benzo[c]phenanthrene; (2) Benz[a]anthracene; (3) triphenylene; (4) chrysene; (5) tetracene. It could be noted that on most commercially available stationary phases the isomer pair, triphenylene/chrysene, coelute. The enhanced shape/size selectivity of the cyanobiphenyl phases for this pair might be due to the liquid crystalline properties of cyanobiphenylpolysiloxanes.

Figure 7:
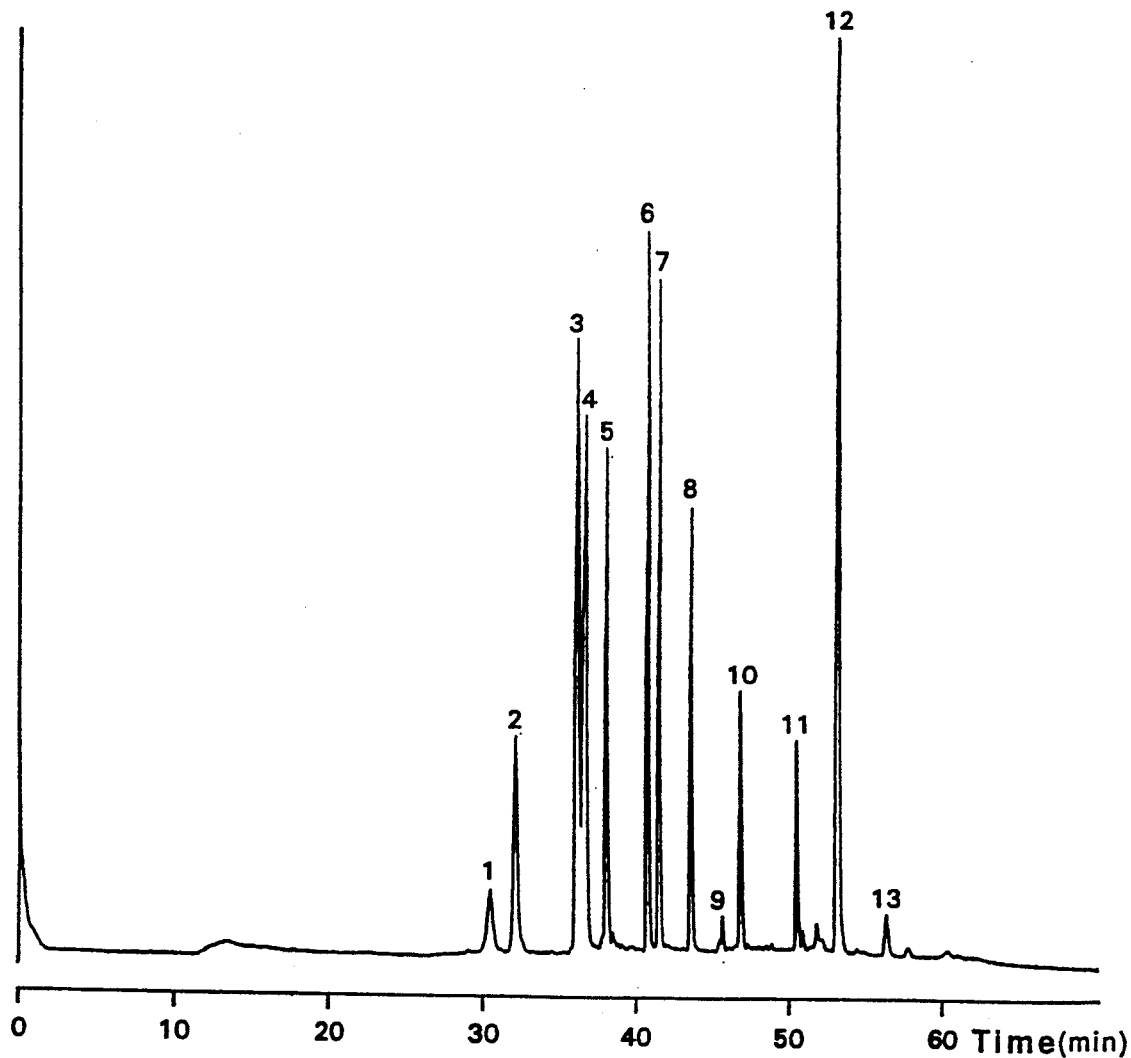
FIG. 7 illustrates the supercritical fluid chromatography (SFC) separation of explosives on a cyanobiphenyl column.
Figure 8A:
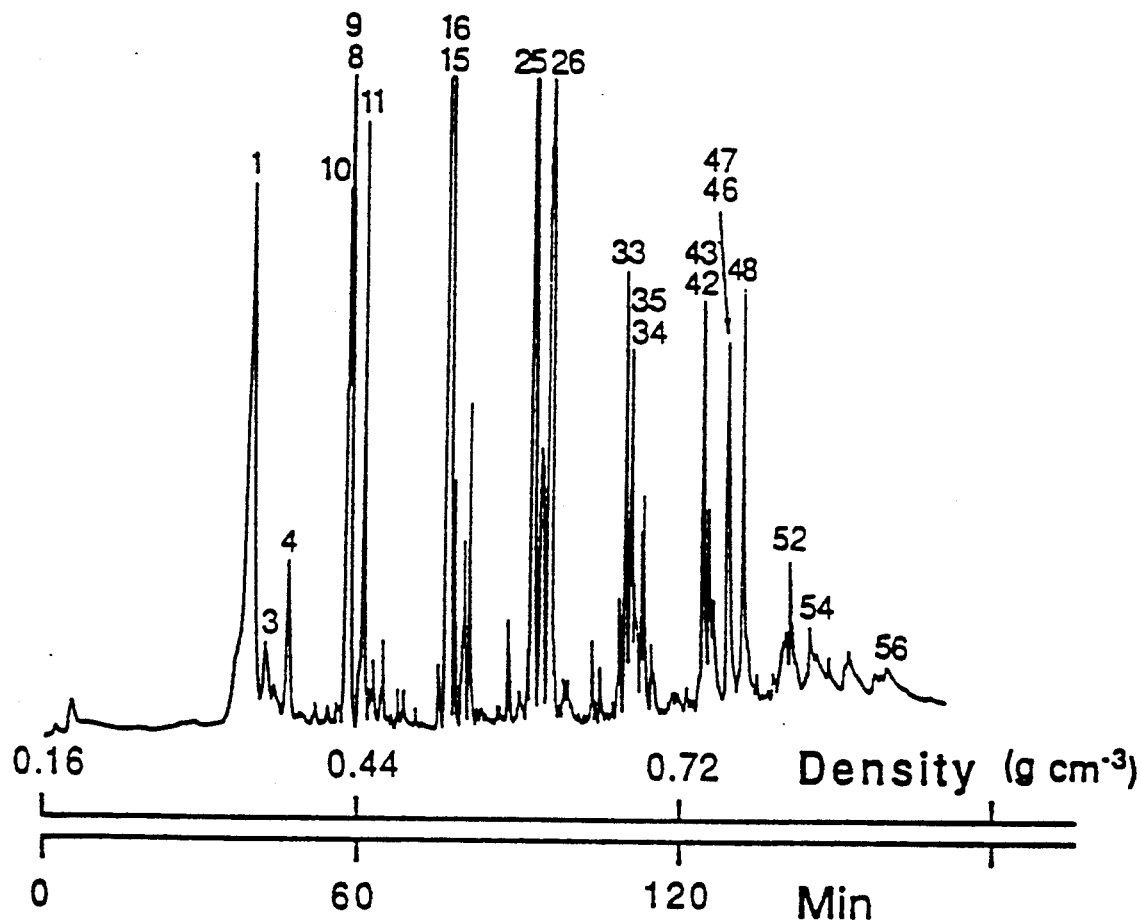
FIGS. 8A, 8B, and 8C represent supercritical fluid chromatographic separation of a coal tar sample on cyanopropyl (A), biphenyl (B), and cyanobiphenyl polysiloxane columns (C).
Figure 8B:
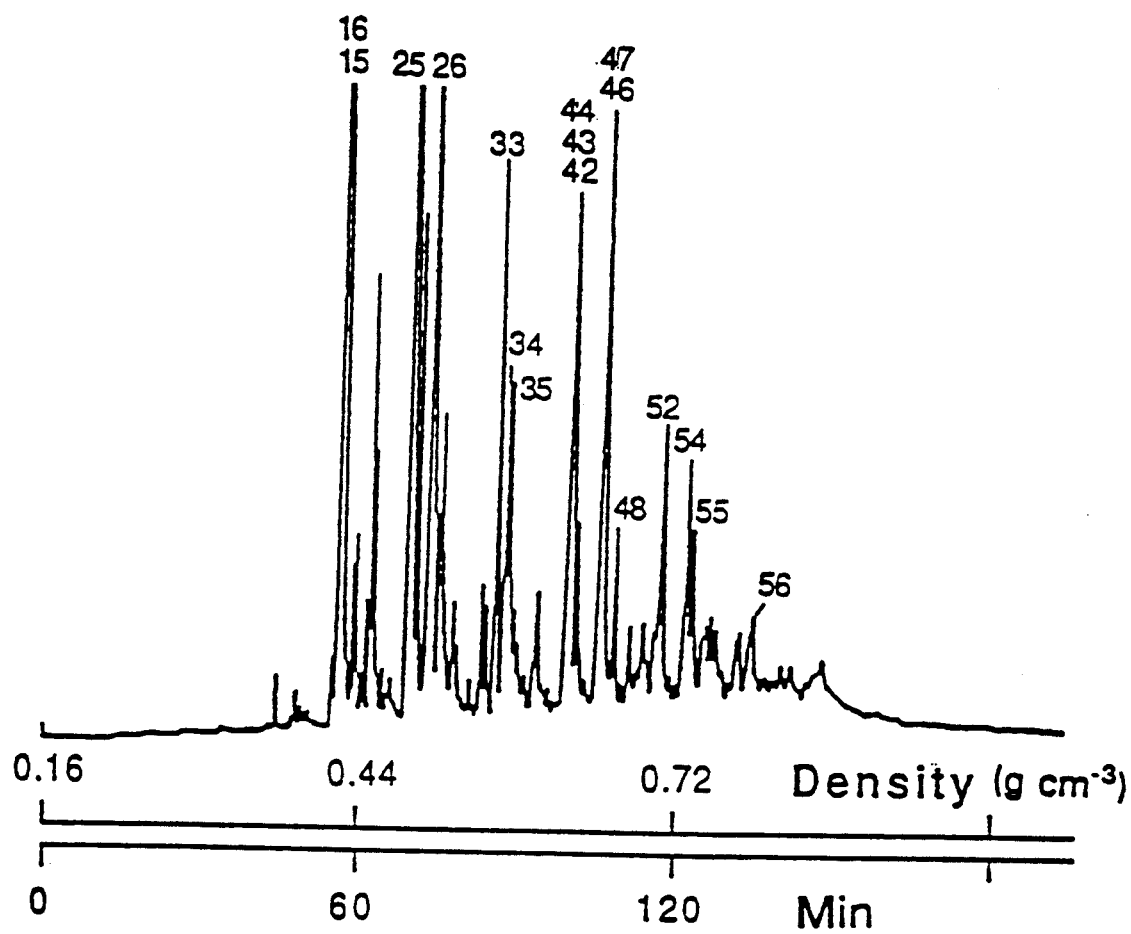
Figure 8C:
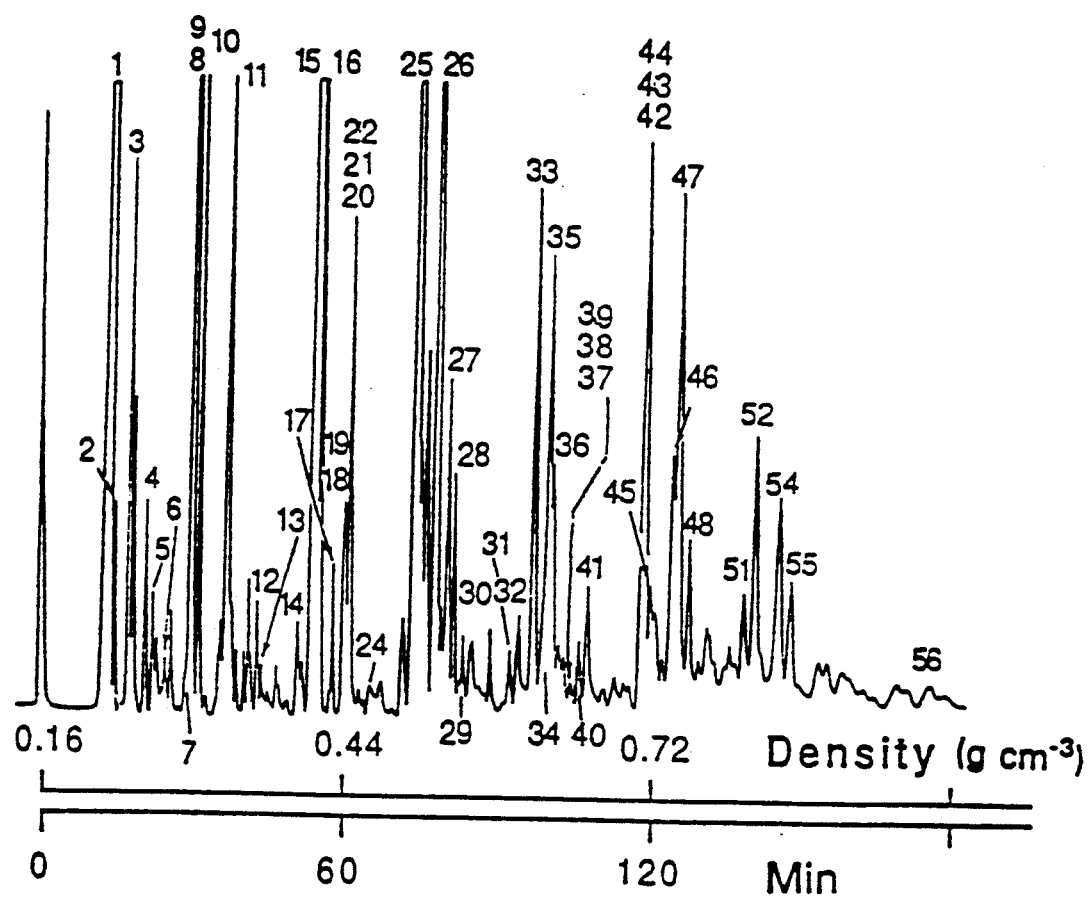

FIGS. 7 and 8 illustrate applications of the new cyanobiphenyl phases in supercritical fluid chromatography (SFC). In FIG. 7, application of one of the new stationary phases for the separation of explosives is demonstrated. The operating conditions were: 6-m×0.05-mm i.d. cyano-deactivated fused silica capillary; carbon dioxide mobile phase; 110° C.; 2-step density program from 0.25 g cm$^{-3}$ at 0.007 g cm$^{-3}$ mim$^{-1}$ to 0.3 g cm$^{-3}$; then at 0.04 g cm$^{-3}$ min$^{-1}$ to 0.77 g cm$^{-3}$. Peak identifications: (1) dibenzofuran; (2) 2,6-dinitrotoluene; (3) diphenylamine; (4) 2,4-dinitrotoluene; (5) 2-nitronaphthalene; (6) trintrotoluene; (7) 2-nitrodiphenylamine; (8) trinitrobenzene; (9) n-nitrosodiphenylamine; (10) pyrene; (11) benz[a]anthracene; (12) 1-nitropyrene; (13) benzo[a]pyrene.

FIG. 8 explores supercritical fluid chromatography (SFC) separation of a mixture of polycyclic aromatic organic compounds from a coal tar sample on a cyanobiphenyl column. The operating conditions were: 6-m×0.05-mm i.d. fused silica capillary columns (A and C) and 10-m×0.05-mm i.d. fused silica capillary column (B); density programming from 0. 16 g mL$^{-1}$ to 0.77 g mL$^{-1}$ at 0.0048 g mL$^{-1}$ min$^{-1}$ (A and C), and from 0.02 g mL$^{-1}$ to 0.76 g mL$^{-1}$ at 0.005 g mL$^{-1}$ min$^{-1(B)}$; 100° C. isothermal. Peak identifications are shown in Table V.

TABLE V

Polycyclic aromatic hydrocarbons in a coal tar sample separated by supercritical fluid chromatography (SFC).

| Peak No. | Identification |
|---|---|
| 1 | naphthalene |
| 2 | benzothiophene |
| 3 | 2-methylnaphtahlene |
| 4 | biphenyl |
| 5 | 1,6-dimethylnaphthalene |
| 6 | 2,3-dimethylnaphthalene |
| 7 | acenaphthene |
| 8 | acenaphthylene |
| 9 | 2,3,6-trimethylnaphthalene |
| 10 | dibenzofuran |
| 11 | fluorene |
| 12 | 1-methylfluorene |
| 13 | 2-methylfluorene |
| 14 | dibenzothiophene |
| 15 | phenanthrene |
| 16 | anthracene |
| 17 | 3-methylphenanthrene |
| 18 | 2-methylphenanthrene |
| 19 | 2-methylanthracene |
| 20 | 2-phenylnaphthalene |
| 21 | 4H-cyclopenta[def]phenanthrene |
| 22 | 1-methylphenanthrene |
| 23 | 1-methylanthracene |
| 24 | anthrone |
| 25 | fluoranthene |
| 26 | pyrene |
| 27 | benzo[a]fluorine |
| 28 | benzo[b]fluorine |
| 29 | 2-methylpyrene |
| 30 | 1-methylpyrene |
| 31 | benzo[b]naphto[2,1-d]thiophene |
| 32 | benzo[ghi]fluoranthene |
| 33 | benz[a]anthracene |
| 34 | triphenylene |
| 35 | chrysene |
| 36 | cyclopenta[cd]pyrene |
| 37 | 5-methylchrysene |
| 38 | 4-methylchrysene |
| 39 | 3-methylchrysene |
| 40 | 2-methylchrysene |
| 41 | 1-methylchrysene |
| 42 | benzo[b]fluoranthene |
| 43 | benzo[j]fluoranthene |
| 44 | benzo[k]fluoranthene |
| 45 | benzo[a]fluoranthene |
| 46 | benzo[e]pyrene |
| 47 | benzo[a]pyrene |
| 48 | perylene |
| 49 | dibenz[a,h]anthracene |
| 50 | dibenz[a,c]anthracene |
| 51 | benzo[b]chrysene |
| 52 | indeno[1,2,3-cd]pyrene |
| 53 | picene |
| 54 | benzo[ghi]perylene |
| 55 | anthanthrene |
| 56 | coronene |

The separation is superior to those obtained on cyanopropyl or previously reported biphenyl columns, Davis et al., *Multidimensional Chromatography*, M. J. Cortes Ed. (Marcel Dekker, New York, 1990), p. 301. It is believed that this improvement is due to the liquid crystalline behavior of the cyanobipenylpolysiloxanes, Kostromin et al., *Vysokomolekulyarnye Soedineniya* 35, 115 (1991), as well as through concerted effects of cyano and the biphenyl moieties on the solute retention mechanism.

Figure 9:
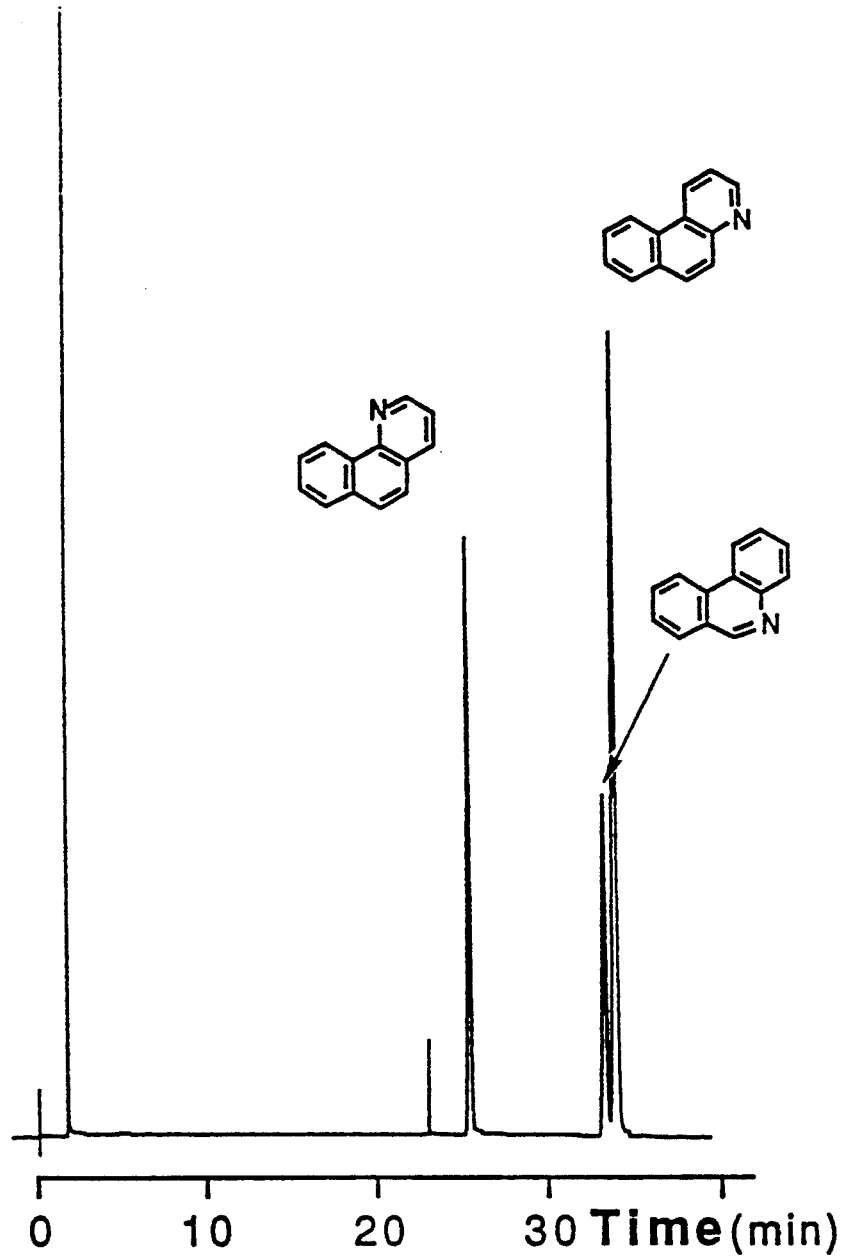
FIG. 9 represents a gas chromatogram of isomeric nitrogen-containing heterocyclic compounds with the same molecular shapes but differing in the position of the nitrogen atom.

FIG. 9 shows the selectivity of the cyano-substituted biphenyl polysiloxane in the chromatographic separation of structural isomers of heterocyclic aromatic compounds which have the same shape but have heteroatoms occupying different positions in the molecule. The operating conditions were: 30-m×0.2-mm i.d. fused silica column with m-CN, m-allyloxy cyanobiphenyl stationary phase; film thickness 0.2 mm; 180° C. isothermal; helium carrier gas; FID; split injection (200:1).

As can be seen from the above examples, the various polysiloxanes containing pendant cyano-substituted biphenyls, have been chromatographically tested and have shown utility in separating of organic components such as isomers of polycyclic aromatic hydrocarbons.

From the foregoing, it will be appreciated that the polymers of the present invention provide stationary phases which achieve chromatographic separation of isomers of polycyclic aromatic hydrocarbons heretofore not possible, and also achieve unexpectedly different separation of isomers of polycyclic aromatic hydrocarbons analyzed in the prior art. Furthermore, the smectic phases of the polymers of the present invention provide different selectively and better efficiency, and therefore good separation of isomers of polycyclic aromatic hydrocarbons. Moreover, the polymers of the present invention have utility over a wide temperature range.

The present invention may be embodied in other specific forms without departing from its form, spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for achieving chromatographic separations of organic compounds from a mixture of organic compounds, comprising the steps of:

(a) providing a chromatography column coated with a stationary phase, having the formula:

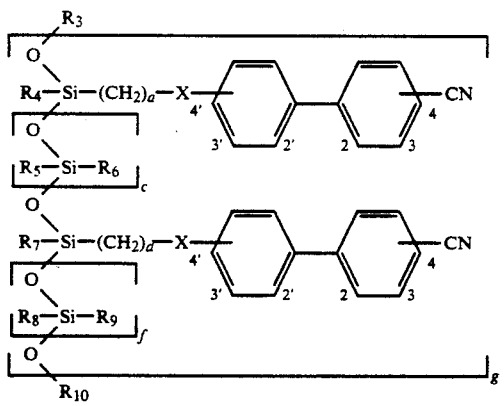

wherein a and d are integers from about 0 to 22; c and f are integers from about 0 to 10; g is an integer from about 1 to 200; $R_3$ and $R_{10}$ are selected from the group consisting of hydrogen, lower alkyl, lower aryl, lower arylalkyl, lower silyl alkyl, and substitutions thereof, $R_4$, $R_5$, $R_6$, $R_7$, $R_8$, and $R_9$ are selected from the group consisting of hydrogen, lower alkyl, lower aryl and lower arylalkyl and X is a linking group that does not interfere with the use of the polymer as a stationary phase for chromatographic columns;

(b) passing said mixture of organic compounds through the column whereby said mixture is separated into separate components; and (c) detecting and identifying the various components after their separation from the column.

2. A method as defined in claim 1 wherein X is selected from the group consisting of O, S, and $CH_2$.

3. A method as defined in claim 1 wherein said column is a gas chromatography column.

4. A method as defined in claim 3 wherein said stationary phase is applied to the interior surface of said column.

5. A method as defined in claim 4 wherein the stationary phase is fused to the interior surface of said column.

6. A method as defined in claim 3 wherein said stationary phase is coated onto particles and used as a solid packing in said column.

7. A method as defined in claim 1 wherein said column is a supercritical fluid chromatography column.

8. A method as defined in claim 7 wherein said stationary phase is applied to the interior surface of said column.

9. A method as defined in claim 8 wherein said stationary phase is fused to the interior surface of said column.

10. A method as defined in claim 7 wherein said stationary phase is coated onto particles and used as a solid packing in said column.

11. A method as defined in claim 1 wherein said column is a liquid chromatography column.

12. A method as defined in claim 11 wherein said stationary phase is applied to the interior surface of said column.

13. A method as defined in claim 12 wherein said stationary phase is fused to the interior surface of said column.

14. A method as defined in claim 11 wherein said stationary phase is coated onto particles and used as a solid packing in said column.

15. A method as defined in claim 1 wherein the biphenyl ring of the polysiloxane polymer of the stationary phase has the X linking group in the 2' position and the CN in the 2-position.

16. A method as defined in claim 1 wherein the biphenyl ring of the polysiloxane polymer of the stationary phase has the X linking group in the 3' position and the CN in the 2-position.

17. A method as defined in claim 1 wherein the biphenyl ring of the polysiloxane polymer of the stationary phase has the X linking group in the 4' position and the CN in the 2-position.

18. A method as defined in claim 1 wherein the biphenyl ring of the polysiloxane polymer of the stationary phase has the X linking group in the 2' position and the CN in the 3-position.

19. A method as defined in claim 1 wherein the biphenyl ring of the polysiloxane polymer of the stationary phase has the X linking group in the 3' position and the CN in the 3-position.

20. A method as defined in claim 1 wherein the biphenyl ring of the polysiloxane polymer of the stationary phase has the X linking group in the 4' position and the CN in the 3-position.

21. A method as defined in claim 1 wherein the biphenyl ring of the polysiloxane polymer of the stationary phase has the X linking group in the 2' position and the CN in the 4-position.

22. A method as defined in claim 1 wherein the biphenyl ring of the polysiloxane polymer of the stationary phase has the X linking group in the 3' position and the CN in the 4-position.

23. A method as defined in claim 1 wherein the biphenyl ring of the polysiloxane polymer of the stationary phase has the X linking group in the 4' position and the CN in the 4-position.

24. A method as defined in claim 1 wherein the organic compounds being separated are polycyclic aromatic hydrocarbons.

25. A method as defined in claim 1 wherein the organic compounds being separated are stereoisomers.

* * * * *